US006130310A

United States Patent [19]

Katayama et al.

[11] Patent Number: 6,130,310

[45] Date of Patent: Oct. 10, 2000

[54] ELECTROPHOTOGRAPHIC PHOTOCONDUCTOR AND AROMATIC POLYCARBONATE RESIN FOR USE THEREIN

[75] Inventors: Akira Katayama; Masaomi Sasaki; Katsukiyo Nagai; Chiaki Tanaka; Shinichi Kawamura, all of Shizuoka; Susumu Suzuka, Saitama; Katsuhiro Morooka, Ibaraki, all of Japan

[73] Assignee: Ricoh Company, Ltd., Tokyo, Japan

[21] Appl. No.: 09/438,375

[22] Filed: Nov. 12, 1999

Related U.S. Application Data

[62] Division of application No. 09/059,998, Apr. 15, 1998, Pat. No. 6,045,959.

[30] Foreign Application Priority Data

Apr. 15, 1997 [JP] Japan .................................... 9-097424
Apr. 22, 1997 [JP] Japan .................................... 9-118893

[51] Int. Cl.[7] ...................................................... C08G 64/00

[52] U.S. Cl. ............................................ 528/196; 528/198

[58] Field of Search ..................................... 528/196, 198

[56] References Cited

U.S. PATENT DOCUMENTS

| | | | |
|---|---|---|---|
| 5,723,243 | 3/1998 | Sasaki et al. | 430/58.7 |
| 5,747,204 | 5/1998 | Anzai et al. | 430/83 |
| 5,789,128 | 8/1998 | Adachi et al. | 430/58.4 |
| 5,840,454 | 11/1998 | Nagai et al. | 430/58.7 |
| 5,846,680 | 12/1998 | Adachi et al. | 430/83 |
| 5,910,651 | 6/1999 | Ryvkin | 235/462.25 |
| 5,942,363 | 8/1998 | Tanaka et al. | 528/196 |
| 6,018,014 | 1/2000 | Nagai et al. | 528/196 |

*Primary Examiner*—Terressa M. Boykin
*Attorney, Agent, or Firm*—Oblon, Spivak, McClelland, Maier & Neustadt, P.C.

[57] ABSTRACT

An electrophotographic photoconductor includes an electroconductive support, and a photoconductive layer formed thereon containing as an effective component an aromatic polycarbonate resin having a structural unit of formula (I), or in combination with a structural unit of formula (II);

(I)

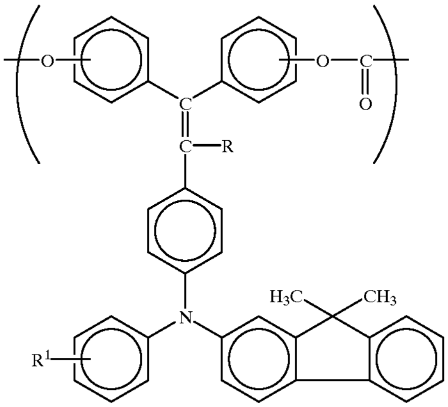

(II)

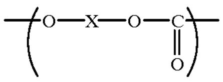

wherein R, $R^1$, and X are as specified in the specification.

12 Claims, 8 Drawing Sheets

ELECTROPHOTOGRAPHIC PHOTOCONDUCTOR AND AROMATIC POLYCARBONATE RESIN FOR USE THEREIN

This application is a Division of application Ser. No. 09/059,998 Filed on Apr. 15, 1998 now U.S. Pat. No. 6,045,959.

BACKGROUND OF THE INVENTION

1. Field of the Invention

The present invention relates to an electrophotographic photoconductor comprising an electroconductive support, and a photoconductive layer formed thereon comprising an aromatic polycarbonate resin. In addition, the present invention also relates to the above-mentioned aromatic polycarbonate resin with charge transporting properties.

2. Discussion of Background

Recently organic photoconductors are used in many copying machines and printers. These organic photoconductors have a layered structure comprising a charge generation layer (CGL) and a charge transport layer (CTL) which are successively overlaid on an electroconductive support. The charge transport layer (CTL) is a film-shaped layer comprising a binder resin and a low-molecular-weight charge transport material (CTM) dissolved therein. The addition of such a low-molecular-weight charge transport material (CTM) to the binder resin lowers the intrinsic mechanical strength of the binder resin, so that the CTL film becomes fragile. Such lowering of the mechanical strength of the CTL causes the wearing of the photoconductor or forms scratches and cracks in the surface of the photoconductor.

Although some vinyl polymers such as polyvinyl anthracene, polyvinyl pyrene and poly-N-vinylcarbazole have been studied as high-molecular-weight photoconductive materials for forming a charge transport complex for use in the conventional organic photoconductor, such polymers are not satisfactory from the viewpoint of photosensitivity.

In addition, high-molecular-weight materials having charge transporting properties have been also studied to eliminate the shortcomings of the above-mentioned layered photoconductor. For instance, there are proposed an acrylic resin having a triphenylamine structure as reported by M. Stolka et al., in “J. Polym. Sci., vol 21, 969 (1983)”; a vinyl polymer having a hydrazone structure as described in “Japan Hard Copy ’89 p. 67”; and polycarbonate resins having a triarylamine structure as disclosed in U.S. Pat. Nos. 4,801,517, 4,806,443, 4,906,444, 4,937,165, 4,959,288, 5,030,532, 5,034,296, and 5,090,989, and Japanese Laid-Open Patent Applications Nos. 64-9964, 3-221522, 2-304456, 4-11627, 4-175337, 4-19371, 4-31404, 4-133065, 9-272735 and 9-297419. However, any materials have not yet been put to practical use.

According to the report of “Physical Review B46 6705 (1992)” by M. A. Abkowitz et al., it is confirmed that the drift mobility of a high-molecular weight charge transport material is lower than that of a low-molecular weight material by one figure. This report is based on the comparison between the photoconductor comprising a low-molecular weight tetraarylbenzidine derivative dispersed in the photoconductive layer and the one comprising a high-molecular polycarbonate having a tetraarylbenzidine structure in its molecule. The reason for this has not been clarified, but it is suggested that the photoconductor employing the high-molecular weight charge transport material produces poor results in terms of the photosensitivity and the residual potential although the mechanical strength of the photoconductor is improved.

Conventionally known representative aromatic polycarbonate resins are obtained by allowing 2,2-bis(4-hydroxyphenyl)propane (hereinafter referred to as bisphenol A) to react with a carbonate precursor material such as phosgene or diphenylcarbonate. Such polycarbonate resins made from bisphenol A are used in many fields because of their excellent characteristics, such as high transparency, high heat resistance, high dimensional accuracy, and high mechanical strength.

For example, this kind of polycarbonate resin is intensively studied as a binder resin for use in an organic photoconductor in the field of electrophotography. A variety of aromatic polycarbonate resins have been proposed as the binder resins for use in the charge transport layer of the layered photoconductor.

As previously mentioned, however, the mechanical strength of the aforementioned aromatic polycarbonate resin is decreased by the addition of the low-molecular-weight charge transport material in the charge transport layer of the layered electrophotographic photoconductor.

SUMMARY OF THE INVENTION

It is therefore a first object of the present invention to provide an electrophotographic photoconductor free from the conventional shortcomings, which can show high photosensitivity and high durability.

A second object of the present invention is to provide an aromatic polycarbonate resin that is remarkably useful as a high-molecular-weight charge transport material for use in an organic electrophotographic photoconductor.

The above-mentioned first object of the present invention can be achieved by an electrophotographic photoconductor comprising an electroconductive support, and a photoconductive layer formed thereon comprising as an effective component an aromatic polycarbonate resin comprising a structural unit of formula (I):

(I)

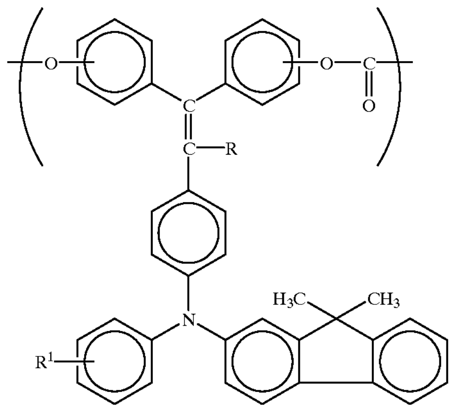

wherein R is a hydrogen atom, an alkyl group which may have a substituent, or an aryl group which may have a substituent; and $R^1$ is an alkyl group which may have a substituent.

The first object of the present invention can also be achieved by an electrophotographic photoconductor comprising an electroconductive support, and a photoconductive layer formed thereon comprising as an effective component an aromatic polycarbonate resin comprising a structural unit of formula (I) and a structural unit of formula (II), with the relationship between the composition ratios being 0<k/(k+j)≦1 when the composition ratio of the structural unit of formula (I) is k and that of the structural unit of formula (II) is j:

(I)

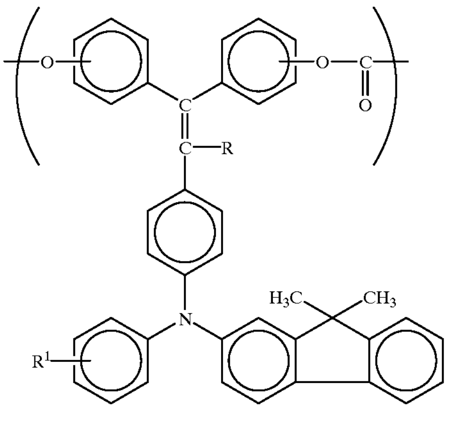

(II)

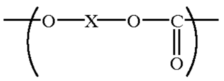

wherein R is a hydrogen atom, an alkyl group which may have a substituent, or an aryl group which may have a substituent; $R^1$ is an alkyl group which may have a substituent; and X is a bivalent aliphatic group, a bivalent cyclic aliphatic group, a bivalent aromatic group, a bivalent group prepared by banding the aforementioned bivalent groups,

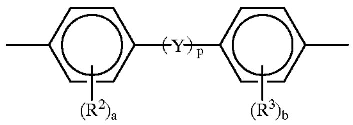

or

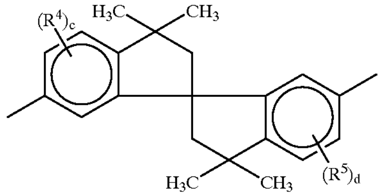

in which $R^2$, $R^3$, $R^4$ and $R^5$ are each independently an alkyl group which may have a substituent, an aryl group which may have a substituent, or a halogen atom; a and b are each independently an integer of 0 to 4; c and d are each independently an integer of 0 to 3; and p is an integer of 0 or 1, and when p=1, Y is a straight-chain alkylene group having 2 to 12 carbon atoms, —O—, —S—, —SO—, —$SO_2$—, —CO—,

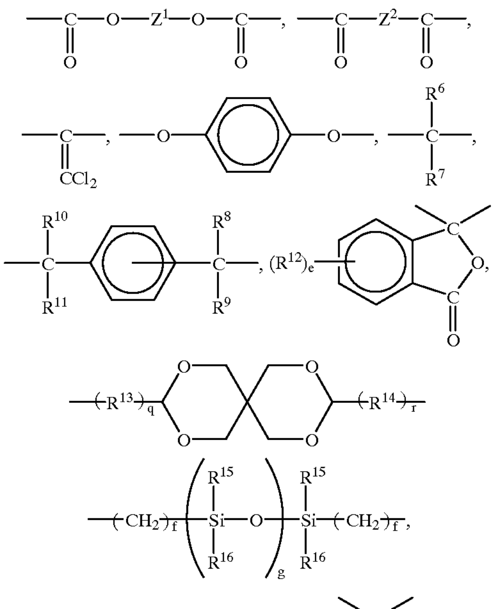

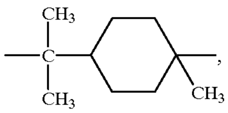

, or

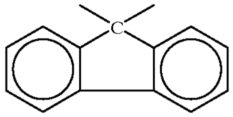

in which $Z^1$ and $Z^2$ are each a substituted or unsubstituted bivalent aliphatic group, or a substituted or unsubstituted arylene group; $R^6$, $R^7$, $R^8$, $R^9$, $R^{10}$, $R^{11}$ and $R^{12}$ are each independently a hydrogen atom, a halogen atom, a substituted or unsubstituted alkyl group having 1 to 5 carbon atoms, a substituted or unsubstituted alkoxyl group having 1 to 5 carbon atoms, or a substituted or unsubstituted aryl group, and $R^6$ and $R^7$ may form together a carbon ring or heterocyclic ring having 5 to 12 carbon atoms or $R^6$ and $R^7$ may form a carbon ring or heterocyclic ring in combination with $R^2$ and $R^3$; q and r are each an integer of 0 or 1, and when q=1 and r=1, $R^{13}$ and $R^{14}$ are each an alkylene group having 1 to 4 carbon atoms; $R^{15}$ and $R^{16}$ are each independently a substituted or unsubstituted alkyl group having 1 to 5 carbon atoms or a substituted or unsubstituted aryl group; e is an integer of 0 to 4; f is an integer of 0 to 20; and g is an integer of 0 to 2000.

The second object of the present invention can be achieved by an aromatic polycarbonate resin comprising a structural unit of formula (I):

(I)

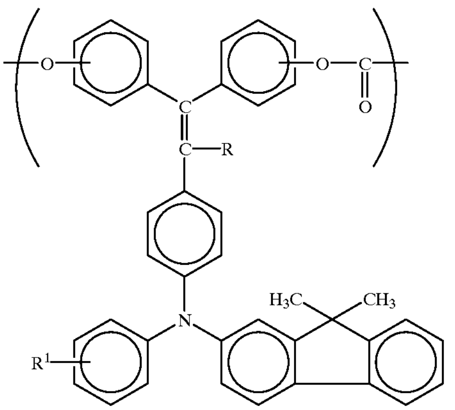

wherein R is a hydrogen atom, an alkyl group which may have a substituent, or an aryl group which may have a substituent; and $R^1$ is an alkyl group which may have a substituent.

The second object of the present invention can also be achieved by an aromatic polycarbonate resin comprising a structural unit of formula (I) and a structural unit of formula (II), with the relationship between the composition ratios being $0<k/(k+j)\leqq 1$ when the composition ratio of the structural unit of formula (I) is k and that of the structural unit of formula (II) is j:

(I)

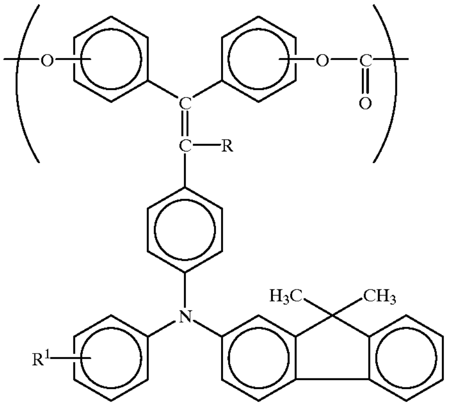

(II)

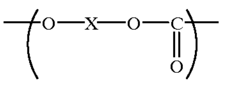

wherein R is a hydrogen atom, an alkyl group which may have a substituent, or an aryl group which may have a substituent; $R^1$ is an alkyl group which may have a substituent; and X is a bivalent aliphatic group, a bivalent cyclic aliphatic group, a bivalent aromatic group, a bivalent group prepared by bonding the aforementioned bivalent groups,

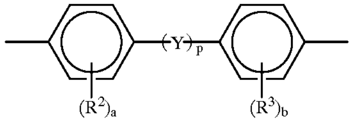

or

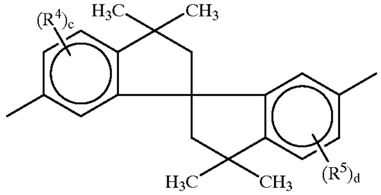

in which $R^2$, $R^3$, $R^4$ and $R^5$ are each independently an alkyl group which may have a substituent, an aryl group which may have a substituent, or a halogen atom; a and b are each independently an integer of 0 to 4; c and d are each independently an integer of 0 to 3; and p is an integer of 0 or 1, and when p=1, Y is a straight-chain alkylene group having 2 to 12 carbon atoms, —O—, —S—, —SO—, $—SO_2—$, —CO—,

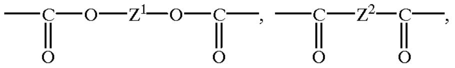

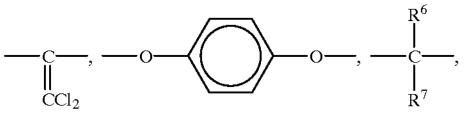

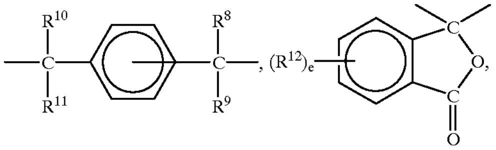

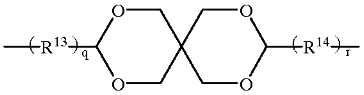

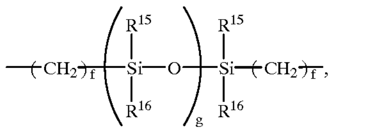

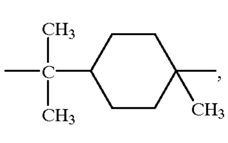

, or

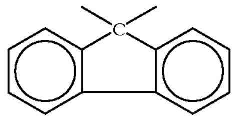

in which $Z^1$ and $Z^2$ are each a substituted or unsubstituted bivalent aliphatic group, or a substituted or unsubstituted arylene group; $R^6$, $R^7$, $R^8$, $R^9$, $R^{10}$, $R^{11}$ and $R^{12}$ are each independently a hydrogen atom, a halogen atom, a substituted or unsubstituted alkyl group having 1 to 5 carbon atoms, a substituted or unsubstituted alkoxyl group having 1 to 5 carbon atoms, or a substituted or unsubstituted aryl group, and $R^6$ and $R^7$ may form together a carbon ring or heterocyclic ring having 5 to 12 carbon atoms or $R^6$ and $R^7$ may form a carbon ring or heterocyclic ring in combination with $R^2$ and $R^3$; q and r are each an integer of 0 or 1, and when q=1 and r=1, $R^{13}$ and $R^{14}$ are each an alkylene group having 1 to 4 carbon atoms; $R^{15}$ and $R^{16}$ are each independently a substituted or unsubstituted alkyl group having 1 to 5 carbon atoms or a substituted or unsubstituted aryl group; e is an integer of 0 to 4; f is an integer of 0 to 20; and g is an integer of 0 to 2000.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
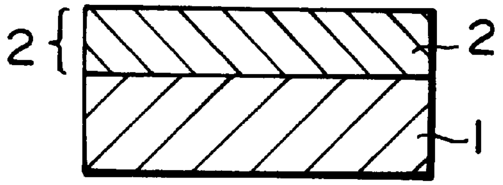
FIG. 1 is a schematic cross-sectional view of a first example of an electrophotographic photoconductor according to the present invention.

The electrophotographic photoconductor according to the present invention comprises a photoconductive layer comprising (i) an aromatic polycarbonate resin comprising the structural unit represented by formula (I) which is provided with charge transporting properties, or (ii) an aromatic polycarbonate resin comprising the structural unit of formula (I) and the structural unit of formula (II). In the above-mentioned aromatic polycarbonate resin (i), the polycarbonate resin may comprise at least the structural unit of formula (I) or consist essentially of the structural unit of formula (I). Alternatively, the aromatic polycarbonate resin (ii) is a copolymer resin having the structural unit of formula (I) with the charge transporting properties, and the structural unit of formula (II) capable of imparting other properties than the charge transporting properties.

Those aromatic polycarbonate resins, which are novel compounds, have charge transporting properties and high mechanical strength, and in addition, show sufficient electrical, optical and mechanical characteristics required for the photoconductive layer of the photoconductor. Consequently, the photoconductor of the present invention can exhibit high photosensitivity and excellent durability.

Those aromatic polycarbonate resins according to the present invention can be obtained by the method of synthesizing a conventional polycarbonate resin, that is, polymerization of a bisphenol and a carbonic acid derivative.

To be more specific, the aromatic polycarbonate resin comprising the structural unit of formula (I) can be produced by the polymerization of a diol compound with the charge transporting properties, represented by the following formula (III) with a halogenated carbonyl compound such as phosgene in accordance with interfacial polymerization:

(III)

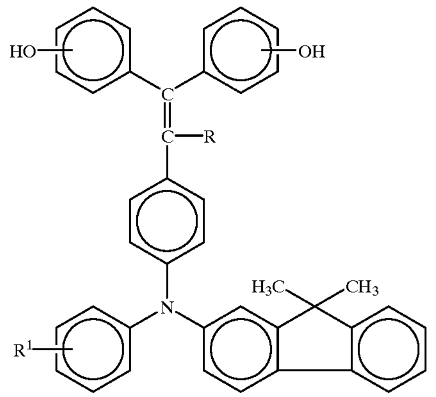

In addition to the phosgene, trichloromethyl chloroformate that is a dimer of phosgene, and bis(trichloromethyl) carbonate that is a trimer of phosgene are usable as the halogenated carbonyl compounds in the above-mentioned polymerization. Further, halogenated carbonyl compounds derived from other halogen atoms than chlorine, for example, carbonyl bromide, carbonyl iodide and carbonyl fluoride are also employed.

Those conventional synthesis methods are described in the reference, such as "Handbook of Polycarbonate Resin" (issued by The Nikkan Kogyo Shimbun Ltd.).

When one or more diol compounds of the formula (III) with the charge transporting properties are employed in combination with a diol compound of the following formula (IV) in the course of the polymerization with the phosgene, there can be obtained an aromatic polycarbonate copolymer resin of the present invention comprising the structural unit of formula (I) and the structural unit of formula (II), which exhibits improved mechanical strength:

$$OH—X—OH \quad (IV)$$

wherein X is the same as that previously defined in formula (II).

In the preparation of the above-mentioned polycarbonate copolymer resin, a plurality of diol compounds represented by formula (IV) may be employed.

In such a synthesis method, the ratio of the diol compound with the charge transporting properties, represented by formula (III), to the diol compound of formula (IV) can be selected within a wide range in light of the desired characteristics of the obtained aromatic polycarbonate resin.

In addition, the aromatic polycarbonate resin in the form of a random copolymer comprising the structural units of formulas (I) and (II) can be obtained by appropriately selecting the polymerization process. For instance, when the diol compound of formula (III) and the diol compound of formula (IV) are uniformly mixed prior to the condensation reaction with the phosgene, there can be obtained a random copolymer comprising the structural unit of formula (I) and the structural unit of formula (II).

The interfacial polymerization is carried out at the interface between two phases of an alkaline aqueous solution of a diol and an organic solvent which is substantially incompatible with water and capable of dissolving a polycarbonate therein in the presence of the carbonic acid derivative and a catalyst. In this case, a polycarbonate resin with a narrow molecular-weight distribution can be speedily obtained by emulsifying the reactive medium through the high-speed stirring operation or addition of an emulsifying material.

As a base for preparing the alkaline aqueous solution, there can be employed an alkali metal and an alkaline earth metal. Specific examples of the base include hydroxides such as sodium hydroxide, potassium hydroxide and calcium hydroxide; and carbonates such as sodium carbonate, potassium carbonate, calcium carbonate and sodium hydrogencarbonate. Those bases may be used alone or in combination. Of those bases, sodium hydroxide and potassium hydroxide are preferable. In addition, distilled water or deionized water are preferably employed for the preparation of the above-mentioned alkaline aqueous solution.

Examples of the organic solvent used in the above-mentioned interfacial polymerization are aliphatic halogenated hydrocarbon solvents such as dichloromethane, 1,2-dichloroethane, 1,2-dichloroethylene, trichloroethane, tetrachloroethane and dichloropropane; aromatic halogenated hydrocarbon solvents such as chlorobenzene and dichlorobentene; and mixed solvents thereof. Further, aromatic hydrocarbon solvents such as toluene, xylene and ethylbenzene, or aliphatic hydrocarbon solvents such as hexane and cyclohexane may be added to the above-mentioned solvents. Of those organic solvents, dichloromethane and chlorobenzene are preferable in the present invention.

Examples of the catalyst used in the preparation of the polycarbonate resin are a tertiary amine, a quaternary ammonium salt, a tertiary phosphine, a quaternary phosphonium salt, a nitrogen-containing heterocyclic compound and salts thereof, an iminoether and salts thereof, and a compound having amide group.

Specific examples of such a catalyst include trimethylamine, triethylamine, tri-n-propylamine, tri-n-hexylamine, N,N,N',N'-tetramethyl-1,4-tetramethylenediamine, 4-pyrrolidinopyridine, N,N'-dimethylpiperazine, N-ethylpiperidine, benzyltrimethylammonium chloride, benzyltrimethylammonium chloride, tetramethylammonium chloride, tetraethylammonium bromide, phenyltriethylammonium chloride, triethylphosphine, triphenylphosphine, diphenylbutylphosphine, tetra(hydroxymethyl) phosphonium chloride, benzyltriethylphosphonium chloride, benzyltriphenylphosphonium chloride, 4-methylpyridine, 1-methylimlidazole, 1,2-dimethylimidazole, 3-methylpyridazine, 4,6-dimethylpyrimidine, 1-cyclohexyl-3,5-dimethylpyrazole, and 2,3,5,6-tetramethylpyrazine.

Those catalysts may be used alone or in combination. Of the above-mentioned catalysts, the tertiary amine, in particular, a tertiary amine having 3 to 30 carbon atoms, such as triethylamine is preferably employed in the present invention. Before and/or after the carbonic acid derivatives such as phosgene and bischloroformate are placed in the reaction system, any of the above-mentioned catalysts may be added thereto.

To control the molecular weight of the obtained polycarbonate resin, it is desirable to employ a terminator as a molecular weight modifier for any of the above-mentioned polymerization reactions. Consequently, a substituent derived from the terminator may be bonded to the end of the molecule of the obtained polycarbonate resin.

As the terminator for use in the present invention, a monovalent aromatic hydroxy compound and haloformate derivatives thereof, and a monovalent carboxylic acid and halide derivatives thereof can be used alone or in combination.

Specific examples of the monovalent aromatic hydroxy compound are phenols such as phenol, p-cresol, o-ethylphenol, p-ethylphenol, p-isopropylphenol, p-tert-butylphenol, p-cumylphenol, p-cyclohexylphenol, p-octylphenol, p-nonylphenol, 2,4-xylenol, p-methoxyphenol, p-hexyloxyphenol, p-decyloxyphenol, o-chlorophenol, m-chlorophenol, p-chlorophenol, p-bromophenol, pentabromophenol, pentachlorophenol, p-phenylphenol, p-isopropenylphenol, 2,4-di(1'-methyl-1'-phenylethyl)phenol, β-naphthol, α-naphthol, p-(2',4',4'-trimethylchromanyl)phenol, and 2-(4'-methoxyphenyl)-2-(4"-hydroxyphenyl)propane. In addition, alkali metal salts and alkaline earth metal salts of the above phenols can also be employed.

Specific examples of the monovalent carboxylic acid are aliphatic acids such as acetic acid, propionic acid, butyric acid, valeric acid, caproic acid, heptanic acid, caprylic acid, 2,2-dimethylpropionic acid, 3-methylbutyric acid, 3,3-dimethylbutyric acid, 4-methylvaleric acid, 3,3-dimethylvaleric acid, 4-methylcaproic acid, 3,5-dimethylcaproic acid and phenoxyacetic acid; and benzoic acids such as p-methylbenzoic acid, p-tert-butylbenzoic acid, p-butoxybenzoic acid, p-octyloxybenzoic acid, p-phenylbenzoic acid, p-benzylbenzoic acid and p-chlorobenzoic acid. In addition, alkali metal salts and alkaline earth metal salts of the above-mentioned aliphatic acids and benzoic acids can also be employed.

Of those terminators, the monovalent aromatic hydroxy compounds, in particular, phenol, p-tert-butylphenol, and p-cumylphenol are preferable.

It is preferable that the aromatic polycarbonate resin used in the photoconductor of the present invention have a number-average molecular weight of 1,000 to 500,000, more preferably in the range of 10,000 to 200,000 when expressed by the styrene-reduced value.

Furthermore, a branching agent may be added in a small amount during the polymerization in order to improve the mechanical properties of the obtained polycarbonate resin. Any compounds having three or more reactive groups, which may be the same or different, selected from the group consisting of an aromatic hydroxyl group, a haloformate group, a carboxylic acid group, a carboxylic acid halide group, and an active halogen atom can be used as the branching agent for use in the present invention.

Specific examples of the branching agent for use in the present invention are as follows:

phloroglucinol,
4,6-dimethyl-2,4,6-tris(4'-hydroxyphenyl)-2-heptene,
4,6-dimethyl-2,4,6-tris(4'-hydroxyphenyl)heptane,
1,3,5-tris(4'-hydroxyphenyl)benzene,
1,1,1-tris(4'-hydroxyphenyl)ethane,
1,1,2-tris(4'-hydroxyphenyl)propane,
α,α,α'-tris(4'-hydroxyphenyl)-1-ethyl-4-isopropylbenzene,
2,4-bis[α-methyl-α-(4'-hydroxyphenyl)ethyl]phenol,
2-(4'-hydroxyphenyl)-2-(2",4"-dihydroxyphenyl)propane,
tris(4-hydroxyphenyl)phosphine,
1,1,4,4-tetrakis(4'-hydroxyphenyl)cyclohexane,
2,2-bis[4',4'-bis(4"-hydroxyphenyl)cyclohexyl]propane,
α,α,α',α'-tetrakis(4'-hydroxyphenyl)-1,4-diethylbenzene,
2,2,5,5-tetrakis(4'-hydroxyphenyl)hexane,
1,1,2,3-tetrakis(4'-hydroxyphenyl)propane,
1,4-bis(4',4"-dihydroxytriphenylmethyl)benzene,
3,3',5,5'-tetrahydroxydiphenyl ether,
3,5-dihydroxybenzoic acid, 3,5-bis(chlorocarbonyloxy)benzoic acid,
4-hydroxyisophthalic acid,
4-chlorocarbonyloxyisophthalic acid,
5-hydroxyphthalic acid,
5-chlorocarbonyloxyphthalic acid,
trimesic trichloride, and
cyanuric chloride.

Those branching agents may be used alone or in combination.

To prevent the oxidation of the diol in the alkaline aqueous solution, an antioxidant such as hydrosulfite may be used in the polymerization reaction.

The interfacial polymerization reaction is generally carried out at temperature in the range of 0 to 40° C., and terminated in several minutes to 5 hours. It is desirable to maintain the reaction system to pH 10 or more.

The polycarbonate resin thus synthesized is purified by removing impurities such as the catalyst and the antioxidant used in the polymerization; unreacted diol and terminator; and an inorganic salt generated during the polymerization. Thus, the polycarbonate resin is subjected to the preparation of the photoconductive layer of the electrophotographic photoconductor according to the present invention. The previously mentioned "Handbook of Polycarbonate Resin" (issued by Nikkan Kogyo Shimbun Ltd.) can be referred to for such a procedure for purifying the polycarbonate resin.

To the aromatic polycarbonate resin produced by the previously mentioned method, various additives such as an antioxidant, a light stabilizer, a thermal stabilizer, a lubricant and a plasticizer can be added when necessary.

The above-mentioned dial compound represented by the formula (III), which is an intermediate for preparation of the aromatic polycarbonate resin according to the present invention, will now be explained in detail.

The dial compound of formula (III) can be synthesized by the conventional method in accordance with the reaction schemes shown below.

A corresponding phosphonate of formula (V) is allowed to react with a carbonyl compound of formula (VI), so that a stilbene compound of formula (VII), that is a novel compound, can be obtained.

Furthermore, cleavage of an ether group or an ester group is carried out in the stilbene compound of formula (VII), so that a diol compound of formula (III) can be obtained.

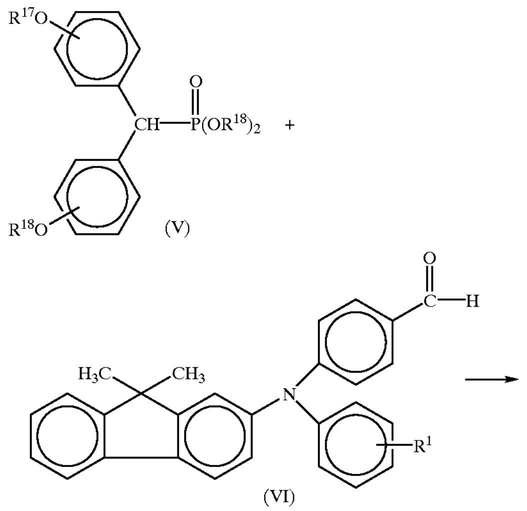

(V)

(VI)

-continued

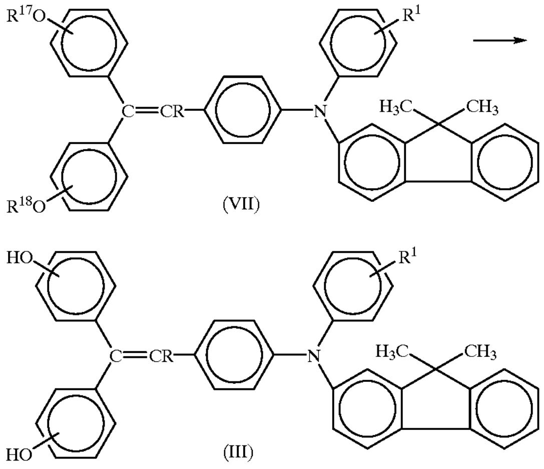

(VII)

(III)

wherein $R^{17}$ and $R^{18}$ are each the same substituted or unsubstituted alkyl group as defined in $R^1$; and R and $R^2$ are the same as those previously defined. A variety of materials such as a polycarbonate resin, polyester resin, polyurethane resin and epoxy resin can be obtained by deriving from the hydroxyl group of the above-mentioned diol compound. In other words, the diol compound of formula (III) for use in the present invention is considered to be useful as an intermediate for the preparation of the above-mentioned materials. In particular, the above-mentioned diol compound is useful as the intermediate for the preparation of the polycarbonate resin.

The polycarbonate resin comprising the structural unit of formula (I) according to the present invention will now be explained in detail.

In the formula (I), R is a hydrogen atom, a substituted or unsubstituted alkyl group, or a substituted or unsubstituted aryl group; and $R^1$ is a substituted or unsubstituted alkyl group.

The alkyl group represented by R is a straight-chain, branched or cyclic alkyl group having 1 to 6 carbon atoms. The above alkyl group may have a substituent such as a fluorine atom, cyano group, or a phenyl group which may have a substituent selected from the group consisting of a halogen atom and a straight-chain, branched or cyclic alkyl group having 1 to 6 carbon atoms.

Specific examples of the above alkyl group include methyl group, ethyl group, n-propyl group, i-propyl group, tert-butyl group, sec-butyl group, n-butyl group, i-butyl group, trifluoromethyl group, 2-cyanoethyl group, benzyl group, 4-chlorobenzyl group, 4-methylbenzyl group, cyclopentyl group and cyclohexyl group.

Examples of the aryl group represented by R are phenyl group, naphthyl group, biphenylyl group, terphenylyl group, pyrenyl group, fluorenyl group, 9,9-dimethyl-2-fluorenyl group, azulenyl group, anthryl group, triphenylenyl group, chrysenyl group, fluorenylidenephenyl group, 5H-dibenzo[a,d]cycloheptenylidenephenyl group, thienyl group, benzothienyl group, furyl group, benzofuranyl group, carbazolyl group, pyridinyl group, pyrrolidyl group, and oxazolyl group.

The above-mentioned aryl group may have a substituent such as the above-mentioned substituted or unsubstituted alkyl group, an alkoxyl group having such an alkyl group, a halogen atom such as fluorine atom, chlorine atom, bromine atom and iodine atom, or an amino group represented by the following formula:

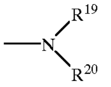

in which $R^{19}$ and $R^{20}$ each is the same substituted or unsubstituted alkyl group or aryl group as defined in R, and $R^{19}$ and $R^{20}$ may form a ring together or in combination with a carbon atom of the aryl group to constitute piperidino group, morpholino group or julolidyl group.

In the formula (I), $R^1$ is an alkyl group which may have a substituent.

The alkyl group represented by $R^1$ is a straight-chain, branched and cyclic alkyl group having 1 to 6 carbon atoms. The above alkyl group may have a substituent such as a fluorine atom, cyano group, or a phenyl group which may have a substituent selected from the group consisting of a halogen atom and a straight-chain, branched and cyclic alkyl group having 1 to 6 carbon atoms.

Specific examples of the above alkyl group represented by $R^1$ include methyl group, ethyl group, n-propyl group, i-propyl group, tert-butyl group, sec-butyl group, n-butyl group, i-butyl group, trifluoromethyl group, 2-cyanoethyl group, benzyl group, 4-chlorobenzyl group, 4-methylbenzyl group, cyclopentyl group and cyclohexyl group.

According to the present invention, the photoconductive layer of the electrophotoconductor comprises as an effective component a polycarbonate resin comprising the structural unit of formula (I) which is provided with the charge transporting properties. To control the mechanical characteristics of the obtained polycarbonate resin, a copolymer resin comprising the structural unit of formula (I) and the structural unit for use in the conventionally known polycarbonate resin, for example, as described in the previously mentioned "Handbook of Polycarbonate Resin" (issued by The Nikkan Kogyo Shimbun Ltd.) can be employed. The structural unit of formula (II) is one of the conventionally known structural units for use in the polycarbonate resin, which can be preferably employed in the present invention.

The structural unit of formula (II) will now be explained by referring to the diol of formula (IV) that is the starting material for the structural unit of formula (II).

In the case where X in the diol of formula (IV) represents a bivalent aliphatic group or bivalent cyclic aliphatic group, the representative examples of the obtained diol are as follows: ethylene glycol, diethylene glycol, triethylene glycol, polyethylene glycol, polytetramethylene ether glycol, 1,3-propanediol, 1,4-butanediol, 1,5-pentanediol, 3-methyl-1,5-pentanediol, 1,6-hexanediol, 1,5-hexanediol, 1,7-heptanediol, 1,8-octanediol, 1,9-nonanediol, 1,10-decanediol, 1,11-undecanediol, 1,12-dodecanediol, neopentyl glycol, 2-ethyl-1,6-hexanediol, 2-methyl-1,3-propanediol, 2-ethyl-1,3-propanediol, 2,2-dimethyl-1,3-propanediol, 1,3-cyclohexanediol, 1,4-cyclohexanediol, cyclohexane-1,4-dimethanol, 2,2-bis(4-hydroxycyclohexyl) propane, xylylenediol, 1,4-bis(2-hydroxyethyl)benzene, 1,4-bis(3-hydroxypropyl)benzene, 1,4-bis(4-hydroxybutyl) benzene, 1,4-bis(5-hydroxypentyl)benzene, and 1,4-bis(6-hydroxyhexyl)benzene.

In the case where X in the diol of formula (IV) represents a bivalent aromatic group, there can be employed any bivalent groups derived from the sane substituted or unsubstituted aryl group as defined in the description of R. In addition, X represents the following bivalent groups:

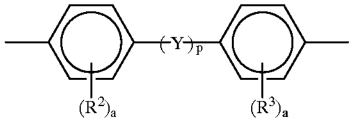

or

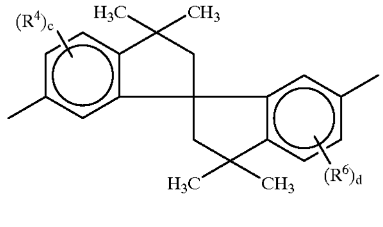

in which $R^2$, $R^3$, $R^4$ and $R^5$ are each independently an alkyl group which may have a substituent, an aryl group which may have a substituent, or a halogen atom; a and b are each independently an integer of 0 to 4; c and d are each independently an integer of 0 to 3; and p is an integer of 0 or 1, and when p=1, Y is a straight-chain alkylene group having 2 to 12 carbon atoms, —O—, —S—, —SO—, —$SO_2$—, —CO—,

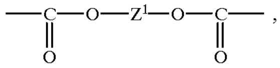 , 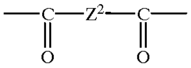 ,

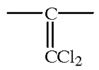 , 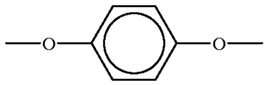 , 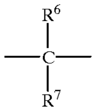 ,

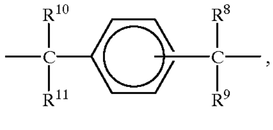 , 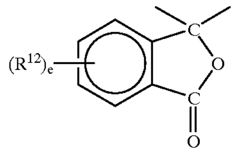 ,

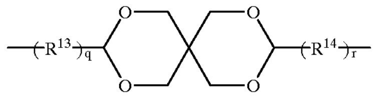

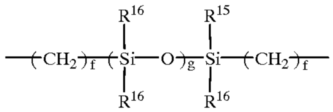

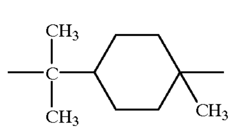 , or 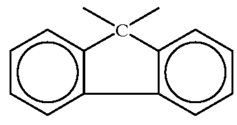

in which $Z^1$ and $Z^2$ are each a substituted or unsubstituted bivalent aliphatic group, or a substituted or unsubstituted arylene group; $R^6$, $R^7$, $R^8$, $R^9$, $R^{10}$, $R^{11}$ and $R^{12}$ are each independently a hydrogen atom, a halogen atom, substituted or unsubstituted alkyl group having 1 to 5 carbon atoms, a substituted or unsubstituted alkoxyl group having 1 to 5 carbon atoms, or a substituted or unsubstituted aryl group, and $R^6$ and $R^7$ may form together a carbon ring or heterocyclic ring having 5 to 12 carbon atoms or $R^6$ and $R^7$ may form a carbon ring or heterocyclic ring in combination with $R^2$ and $R^3$; q and r are each an integer of 0 or 1, and when q=1 and r=1, $R^{13}$ and $R^{14}$ are each an alkylene group having 1 to 4 carbon atoms; $R^{15}$ and $R^{16}$ are each independently a substituted or unsubstituted alkyl group having 1 to 5 carbon atoms or a substituted or unsubstituted aryl group; e is an integer of 0 to 4; f is an integer of 0 to 20; and g is an integer of 0 to 2000.

In the above-mentioned bivalent groups, the same substituted or unsubstituted alkyl group, and the same substituted or unsubstituted aryl group as defined in the description of R in the structural unit of formula (I) can be employed.

Examples of a halogen atom represented by $R^2$ to $R^{12}$ are a fluorine atom, a chlorine atom, a bromine atom and an iodine atom.

When $Z^1$ and $Z^2$ are each a substituted or unsubstituted bivalent aliphatic group, there can be employed any bivalent groups obtained by removing the hydroxyl groups from the diol of formula (IV) in which X represents a bivalent aliphatic group or a bivalent cyclic aliphatic group. On the other hand, when $Z^1$ and $Z^2$ are each a substituted or unsubstituted arylene group, there can be employed any bivalent groups derived from the substituted or unsubstituted aryl group previously defined in the description of R.

Preferable examples of the diol of formula (IV) in which X represents a bivalent aromatic group are as follows:

bis(4-hydroxyphenyl)methane,
bis(2-methyl-4-hydroxyphenyl)methane,
bis(3-methyl-4-hydroxyphenyl)methane,
1,1-bis(4-hydroxyphenyl)ethane,
1,2-bis(4-hydroxyphenyl)ethane,
bis(4-hydroxyphenyl)phenylmethane,
bis(4-hydroxyphenyl)diphenylmethane,
1,1-bis(4-hydroxyphenyl)-1-phenylethane,
1,3-bis(4-hydroxyphenyl)-1,1-demethylpropane,
2,2-bis(4-hydroxyphenyl)propane,
2-(4-hydroxyphenyl)-2-(3-hydroxyphenyl)propane,
1,1-bis(4-hydroxyphenyl)-2-methylpropane,
2,2-bis(4-hydroxyphenyl)butane,
1,1-bis(4-hydroxyphenyl)-3-methylbutane,
2,2-bis(4-hydroxyphenyl)pentane,
2,2-bis(4-hydroxyphenyl)-4-methylpentane,
2,2-bis(4-hydroxyphenyl)hexane,
4,4-bis(4-hydroxyphenyl)heptane,
2,2-bis(4-hydroxyphenyl)nonane,
bis(3,5-dimethyl-4-hydroxyphenyl)methane,
2,2-bis(3-methyl-4-hydroxyphenyl)propane,
2,2-bis(3-isopropyl-4-hydroxyphenyl)propane,
2,2-bis(3-sec-butyl-4-hydroxyphenyl)propane,
2,2-bis(3-tert-butyl-4-hydroxyphenyl)propane,
2,2-bis(3-cyclohexyl-4-hydroxyphenyl)propane,
2,2-bis(3-allyl-4-hydroxyphenyl)propane,
2,2-bis(3-phenyl-4-hydroxyphenyl)propane,
2,2-bis(3,5-dimethyl-4-hydroxyphenyl)propane,
2,2-bis(3-chloro-4-hydroxyphenyl)propane,
2,2-bis(3,5-dichloro-4-hydroxyphenyl)propane,
2,2-bis(3-bromo-4-hydroxyphenyl)propane,
2,2-bis(3,5-dibromo-4-hydroxyphenyl)propane,
2,2-bis(4-hydroxyphenyl)hexafluoropropane,
1,1-bis(4-hydroxyphenyl)cyclopentane,
1,1-bis(4-hydroxyphenyl)cyclohexane,
1,1-bis(3-methyl-4-hydroxyphenyl)cyclohexane,
1,1-bis(3,5-dimethyl-4-hydroxyphenyl)cyclohexane,
1,1-bis(3,5-dichloro-4-hydroxyphenyl)cyclohexane,
1,1-bis(4-hydroxyphenyl)-3,3,5-trimethylcyclohexane,
1,1-bis(4-hydroxyphenyl)cycloheptane,
2,2-bis(4-hydroxyphenyl)norbornane,
2,2-bis(4-hydroxyphenyl)adamantane,
4,4'-dihydroxydiphenyl ether,
4,4'-dihydroxy-3,3'-dimethyldiphenyl ether,
ethylene glycol bis(4-hydroxyphenyl)ether,
4,4'-dihydroxydiphenylsulfide,
3,3'-dimethyl-4,4'-dihydroxydiphenylsulfide,
3,3',5,5'-tetramethyl-4,4'-dihydroxydiphenylsulfide,
4,4'-dihydroxydiphenylsulfoxide,
3,3'-dimethyl-4,4'-dihydroxydiphenylsulfoxide,
4,4'-dihydroxydiphenylsulfone,
3,3'-dimethyl-4,4'-dihydroxydiphenylsulfone,
3,3'-diphenyl-4,4'-dihydroxydiphenylsulfone,
3,3'-dichloro-4,4'-dihydroxydiphenylsulfone,
bis(4-hydroxyphenyl)ketone,
bis(3-methyl-4-hydroxyphenyl)ketone,
3,3,3',3'-tetramethyl-6,6'-dihydroxyspiro(bis)indane,
3,3',4,4'-tetrahydro-4,4,4',4'-tetramethyl-2,2'-spirobi(2H-1-benzopyrane-7,7'-diol,
trans-2,3-bis(4-hydroxyphenyl)-2-butene,
9,9-bis(4-hydroxyphenyl)fluorene,
9,9-bis(4-hydroxyphenyl)xanthene,
1,6-bis(4-hydroxyphenyl)-1,6-hexanedione,
α,α,α',α'-tetramethyl-α,α'-bis(4-hydroxyphenyl)-p-xylene,
α,α,α',α'-tetramethyl-α,α'-bis(4-hydroxyphenyl)-m-xylene,
2,6-dihydroxydibenzo-p-dioxine,
2,6-dihydroxythianthrene,
2,7-dihydroxyphenoxathine,
9,10-dimethyl-2,7-dihydroxyphenazine,
3,6-dihydroxydibenzofuran,
3,6-dihydroxydibenzothiophene,
4,4'-dihydroxybiphenyl,
1,4-dihydroxynaphthalene,
2,7-dihydroxypyrene,
hydroquinone,
resorcin,
ethylene glycol-bis(4-hydroxybenzoate),
diethylene glycol-bis(4-hydroxybenzoate),
triethylene glycol-bis(4-hydroxybenzoate),
1,3-bis(4-hydroxyphenyl)-tetramethyldisiloxane,
and
phenol-modified silicone oil.

Further, an aromatic diol having an ester linkage produced by the reaction between 2 moles of a diol and one mole of isophthaloyl chloride or terephthaloyl chloride is also usable.

In the polycarbonate resin comprising the structural unit of formula (I) and the structural unit of formula (II), the molar ratio of a component composed of the structural unit of formula (I) with respect to the total amount of the polycarbonate resin may be freely determined, but preferably 5 mol % or more, more preferably 20 mol % or more because the total amount of the structural unit of formula (I) has an effect on the charge transporting properties of the obtained polycarbonate resin.

In the photoconductors according to the present invention, at least one of the previously mentioned aromatic polycarbonate resins is contained in the photoconductive layers 2, 2*a*, 2*b*, 2*c*, 2*d*, and 2*e*. The aromatic polycarbonate resin can be employed in different ways, for example, as shown in FIGS. 1 through 6.

In the photoconductor as shown in FIG. 1, a photoconductive layer 2 is formed on an electroconductive support 1, which photoconductive layer 2 comprises an aromatic polycarbonate resin of the present invention and a sensitizing dye, with the addition thereto of a binder agent (binder resin)when necessary. In this photoconductor, the aromatic polycarbonate resin works as a photoconductive material, through which charge carriers which are necessary for the light decay of the photoconductor are generated and transported. However, the aromatic polycarbonate resin itself scarcely absorbs light in the visible light range and, therefore, it is necessary to add a sensitizing dye which absorbs light in the visible light range in order to form latent electrostatic images by use of visible light.

Figure 2:
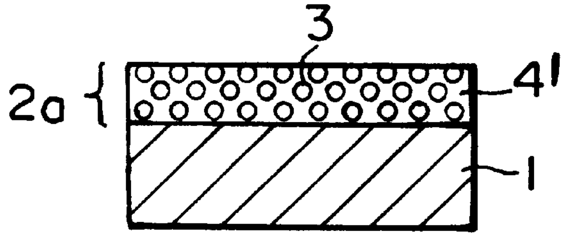
FIG. 2 is a schematic cross-sectional view of a second example of an electrophotographic photoconductor according to the present invention.

Referring to FIG. 2, there is shown an enlarged cross-sectional view of another embodiment of an electrophotographic photoconductor according to the present invention. In this photoconductor, there is formed a photoconductive layer 2*a* on an electroconductive support 1. The photoconductive layer 2*a* comprises a charge transport medium 4' comprising (i) an aromatic polycarbonate resin of the present invention, optionally in combination with a binder agent, and (ii) a charge generation material 3 dispersed in the charge transport medium 4'. In this embodiment, the aromatic polycarbonate resin (or a mixture of the aromatic polycarbonate resin and the binder agent) constitutes the charge transport medium 4'. The charge generation material 3, which is, for example, an inorganic material or an organic pigment, generates charge carriers. The charge transport medium 4' accepts the charge carriers generated by the charge generation material 3 and transports those charge carriers.

In this electrophotographic photoconductor, it is basically necessary that the light-absorption wavelength regions of the charge generation material 3 and the aromatic polycarbonate resin not overlap in the visible light range. This is because, in order that the charge generation material 3 produce charge carriers efficiently, it is necessary that light pass through the charge transport medium 4' and reach the surface of the charge generation material 3. Since the aromatic polycarbonate resin comprising the structural unit of formula (I) do not substantially absorb light with a wavelength of 600 nm or more, it can work effectively as a charge transport material when used with the charge generation material 3 which absorbs the light in the visible region to the near infrared region and generates charge carriers. The charge transport medium 4' may further comprise a low-molecular weight charge transport material.

Figure 3:
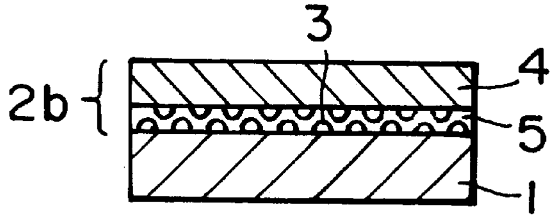
FIG. 3 is a schematic cross-sectional view of a third example of an electrophotographic photoconductor according to the present invention.

Referring to FIG. 3, there is shown an enlarged cross-sectional view of a further embodiment of an electrophotographic photoconductor according to the present invention. In the figure, there is formed on an electroconductive support 1 a two-layered photoconductive layer 2*b* comprising a charge generation layer 5 containing the charge generation material 3, and a charge transport layer 4 comprising an aromatic polycarbonate resin with the charge transporting properties according to the present invention.

In this photoconductor, light which has passed through the charge transport layer 4 reaches the charge generation layer 5, and charge carriers are generated within the charge generation layer 5. The charge carriers which are necessary for the light decay for latent electrostatic image formation are generated by the charge generation material 3, and accepted and transported by the charge transport layer 4. The generation and transportation of the charge carriers are performed by the same mechanism as that in the photoconductor shown in FIG. 2.

In this case, the charge transport layer 4 comprises the aromatic polycarbonate resin, optionally in combination with a binder agent. Furthermore, in order to increase the efficiency of generating the charge carriers, the charge generation layer 5 may further comprise the aromatic polycarbonate resin of the present invention, and the photoconductive layer 2*b* including the charge generation layer 5 and the charge transport layer 4 may further comprise a low-molecular weight charge transport material. This can be applied to the embodiments of FIGS. 4 to 6 to be described later.

Figure 4:
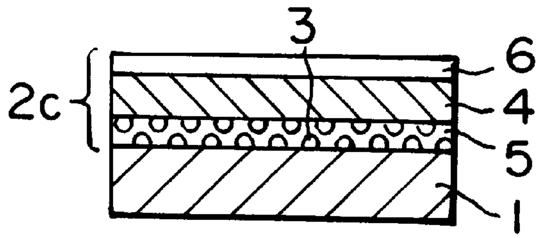
FIG. 4 is a schematic cross-sectional view of a fourth example of an electrophotographic photoconductor according to the present invention.

In the electrophotographic photoconductor of FIG. 3, a protective layer 6 may be provided on the charge transport layer 4 as shown in FIG. 4. The protective layer 6 may comprise the aromatic polycarbonate resin of the present invention, optionally in combination with a binder agent. In such a case, it is effective that the protective layer 6 be provided on a charge transport layer in which a low-molecular weight charge transport material is dispersed. The protective layer 6 may be provided on the photoconductive layer 2*a* of the photoconductor as shown in FIG. 2.

Figure 5:
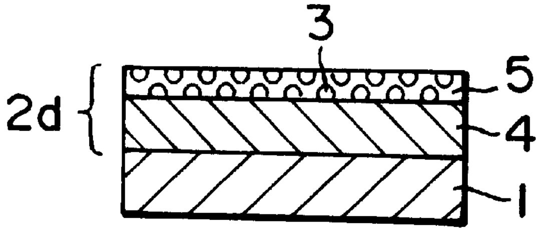
FIG. 5 is a schematic cross-sectional view of a fifth example of an electrophotographic photoconductor according to the present invention.

Referring to FIG. 5, there is shown still another embodiment of an electrophotographic photoconductor according to the present invention. In this figure, the overlaying order of the charge generation layer 5 and the charge transport layer 4 comprising the aromatic polycarbonate resin is reversed in view of the electrophotographic photoconductor as shown in FIG. 3. The mechanism of the generation and transportation of charge carriers is substantially the same as that of the photoconductor shown in FIG. 3.

Figure 6:
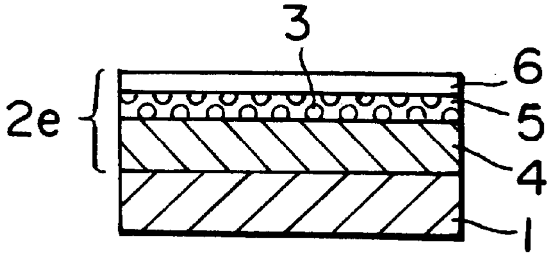
FIG. 6 is a schematic cross-sectional view of a sixth example of an electrophotographic photoconductor according to the present invention.

In the above photoconductor of FIG. 5, a protective layer 6 may be formed on the charge generation layer 5 as shown in FIG. 6 in light of the mechanical strength of the photoconductor.

When the electrophotographic photoconductor according to the present invention as shown in FIG. 1 is prepared, at least one aromatic polycarbonate resin of the present invention is dissolved in a solvent, with the addition thereto of a binder agent when necessary. To the thus prepared solution, a sensitizing dye is added, so that a photoconductive layer coating liquid is prepared. The thus prepared photoconductive layer coating liquid is coated on an electroconductive support 1 and dried, so that a photoconductive layer 2 is formed on the electroconductive support 1.

It is preferable that the thickness of the photoconductive layer 2 be in the range of 3 to 50 μm, more preferably in the range of 5 to 40 μm. It is preferable that the amount of aromatic polycarbonate resin of the present invention be in the range of 30 to 100 wt. % of the total weight of the photoconductive layer 2. It is preferable that the amount of sensitizing dye for use in the photoconductive layer 2 be in the range of 0.1 to 5 wt. %, more preferably in the range of 0.5 to 3 wt. % of the total weight of the photoconductive layer 2.

Specific examples of the sensitizing dye for use in the present invention are triarylmethane dyes such as Brilliant Green, Victoria Blue B, Methyl Violet, Crystal Violet and Acid Violet 6B; xanthene dyes such as Rhodamine B. Rhodamine 6G, Rhodamine G Extra, Eosin S. Erythrosin, Rose Bengale and Fluoresceine; thiazine dyes such as Methylene Blue; and cyanine dyes such as cyanin.

The electrophotographic photoconductor shown in FIG. 2 can be obtained by the following method:

The finely-divided particles of the charge generation material 3 are dispersed in a solution in which at least one aromatic polycarbonate resin of the present invention, or a mixture of the aromatic polycarbonate resin and the binder agent is dissolved, so that a coating liquid for the photoconductive layer 2*a* is prepared. The coating liquid thus prepared is coated on the electroconductive support 1 and then dried, whereby the photoconductive layer 2*a* is provided on the electroconductive support 1.

It is preferable that the thickness of the photoconductive layer 2*a* be in the range of 3 to 50 μm, more preferably in the range of 5 to 40 μm. It is preferable that the amount of aromatic polycarbonate resin with the charge transporting properties be in the range of 40 to 100 wt. % of the total weight of the photoconductive layer 2*a*.

It is preferable that the amount of charge generation material 3 for use in the photoconductive layer 2*a* be in the range of 0.1 to 50 wt. %, more preferably in the range of 1 to 20 wt. % of the total weight of the photoconductive layer 2*a*.

Specific examples of the charge generation material 3 for use in the present invention are as follows: inorganic materials such as selenium, selenium—tellurium, cadmium sulfide, cadmium sulfide—selenium and α-silicon (amorphous silicon); and organic pigments, for example, azo pigments, such as C.I. Pigment Blue 25 (C.I. 21180), C.I. Pigment Red 41 (C.I. 21200), C.I. Acid Red 52 (C.I. 45100), C.I. Basic Red 3 (C.I. 45210), an azo pigment having a carbazole skeleton (Japanese Laid-Open Patent Application 53-95033), an azo pigment having a distyryl benzene skeleton (Japanese Laid-Open Patent Application 53-133445), an azo pigment having a triphenylamine skeleton (Japanese Laid-Open Patent Application 53-132347), an azo pigment having a dibenzothiophene skeleton (Japanese Laid-Open Patent Application 54-21728), an azo pigment having an oxadiazole skeleton (Japanese Laid-Open Patent Application 54-12742), an azo pigment having a fluorenone skeleton (Japanese Laid-Open Patent Application 54-22834), an azo pigment having a bisstilbene skeleton (Japanese Laid-Open Patent Application 54-17733), an azo pigment having a distyryl oxadiazole skeleton (Japanese Laid-Open Patent Application 54-2129), and an azo pigment having a distyryl carbazole skeleton (Japanese Laid-Open Patent Application 54-14967); phthalocyanine pigments such as C.I. Pigment Blue 16 (C.I. 74100); indigo pigments such as C.I. Vat Brown 5 (C.I. 73410)and C.I. Vat Dye (C.I. 73030); and perylene pigments such as Algol Scarlet B and Indanthrene Scarlet R (made by Bayer Co., Ltd.). These charge generation materials may be used alone or in combination.

When the above-mentioned charge generation material comprises a phthalocyanine pigment, the sensitivity and durability of the obtained photoconductor are remarkably improved. In such a case, there can be employed phthalocyanine pigments having a phthalocyanine skeleton as shown in the following formula (VIII):

(VIII)

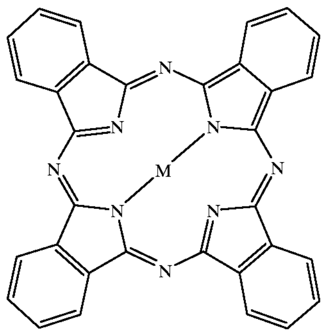

In the above formula (VIII), M (central atom) is a metal atom or hydrogen atom.

To be more specific, as the central atom (M) in the formula (VIII), there can be employed an atom of H, Li, Be, Na, Mg, Al, Si, K, Ca, Sc, Ti, V, Cr, Mn, Fe, Co, Ni, Cu, Zn, Ga, Ge, Y, Zr, Nb, Mo, Tc, Ru, Rh, Pd, Ag, Cd, In, Sn, Sb, Ba, Hf, Ta, W, Re, Os, Ir, Pt, Au, Hg, Tl, La, Ce, Pr, Nd, Pm, Sm, Eu, Gd, Tb, Dy, Ho, Er, Tm, Yb, Lu, Th, Pa, U, Np or Am; the combination of atoms of an oxide, chloride, fluoride, hydroxide or bromide. The central atom is not limited to the above-mentioned atoms.

The above-mentioned charge generation material with a phthalocyanine structure for use in the present invention may have at least the basic structure as shown in formula (VIII). Therefore, the charge generation material may have a dimer structure or trimer structure, and further, a polymeric structure. Further, the above-mentioned basic structure of formula (VIII) may have a substituent.

Of the phthalocyanine compounds represented by formula (VIII), an oxotitanium phthalocyanine compound which has the central atom (M) of TiO in the formula (VIII) and a metal-free phthalocyanine compound which has a hydrogen atom as the central atom (M) are particularly preferred in the present invention because the obtained photoconductors show excellent photoconductive properties.

In addition, it is known that each phthalocyanine compound has a variety of crystal systems. For example, the above-mentioned oxotitanium phthalocyanine has crystal systems of α-type, β-type, γ-type, m-type, and y-type. In the case of copper phthalocyanine, there are crystal systems of α-type, β-type, and γ-type. The properties of the phthalocyanine compound vary depending on the crystal system thereof although the central metal atom is the same. According to "Electrophotography-the Society Journal-Vol. 29, No. 4 (1990)", it is reported that the properties of the photoconductor vary depending on the crystal system of a phthalocyanine contained in the photoconductor. In light of the desired photoconductive properties, therefore, it is important to employ each phthalocyanine in the optimal crystal system. The oxotitanium phthalocyanine in the y-type crystal system is particularly advantageous.

The above-mentioned charge generation materials with phthalocyanine skeleton may be used in combination in the charge generation layer. Further, such charge generation materials with phthalocyanine skeleton may be used in combination with other charge generation materials. In this case, inorganic and organic conventional charge generation materials can be employed.

Specific examples of the inorganic charge generation material are crystalline selenium, amorphous selenium, selenium—tellurium, selenium—tellurium—halogen, selenium—arsenic compound, and a silicon (amorphous silicon). In particular, when the above-mentioned a silicon is employed as the charge generation material, it is preferable that the dangling bond be terminated with hydrogen atom or a halogen atom, or be doped with boron atom or phosphorus atom.

Specific examples of the organic charge generation material which can be used in combination with the phthalocyanine compound are azulenium salt pigment, squaric acid methyne pigment, azo pigment having a carbazole skeleton, azo pigment having a triphenylamine skeleton, azo pigment having a diphenylamine skeleton, azo pigment having a dibenzothiophene skeleton, azo pigment having a fluorenone skeleton, azo pigment having an oxadiazole skeleton, azo pigment having a bisstilbene skeleton, azo pigment having a distyryl oxadiazole skeleton, azo pigment having a distyryl carbazole skeleton, perylene pigment, anthraquinone pigment, polycyclic quinone pigment, quinone imine pigment, diphenylmethane pigment, triphenylmethane pigment, benzoquinone pigment, naphthoquinone pigment, cyanine pigment, azomethine pigment, indigoid pigment, and bisbenzimidazole pigment.

The electrophotographic photoconductor shown in FIG. 3 can be obtained by the following method:

To provide the charge generation layer 5 on the electroconductive support 1, the charge generation material is vacuum-deposited on the electroconductive support 1.

Alternatively, the finely-divided particles of the charge generation material 3 are dispersed in an appropriate solvent, together with the binder agent when necessary, so that a coating liquid for the charge generation layer 5 is prepared. The thus prepared coating liquid is coated on the electroconductive support 1 and dried, whereby the charge generation layer 5 is formed on the electroconductive support 1. The charge generation layer 5 may be subjected to surface treatment by buffing and adjustment of the thickness thereof if required. On the thus formed charge generation layer 5, a coating liquid in which at least one aromatic polycarbonate resin with the charge transporting properties according to the present invention, optionally in combination with a binder agent is dissolved is coated and dried, so that the charge transport layer 4 is formed on the charge generation layer 5. In the charge generation layer 5, the same charge generation materials as employed in the above-mentioned photoconductive layer 2*a* can be used.

The thickness of the charge generation layer 5 is 5 μm or less, preferably 2 μm or less. It is preferable that the thickness of the charge transport layer 4 be in the range of 3 to 50 μm, more preferably in the range of 5 to 40 μm.

When the charge generation layer S is provided on the electroconductive support 1 by coating the dispersion in which finely-divided particles of the charge generation material 3 are dispersed in an appropriate solvent, it is preferable that the amount of finely-divided particles of the charge generation material 3 for use in the charge generation layer 5 be in the range of 10 to 100 wt. %, more preferably in the range of about 50 to 100 wt. % of the total weight of the charge generation layer 5. It is preferable that the amount of aromatic polycarbonate resin of the present invention 4 be in the range of 40 to 100 wt. % of the total weight of the charge transport layer 4.

The photoconductive layer 2*b* of the photoconductor shown in FIG. 3 may comprise a low-molecular-weight charge transport material as previously mentioned.

Examples of the low-molecular-weight charge transport material for use in the present invention are as follows: oxazole derivatives, oxadiazole derivatives (Japanese Laid-Open Patent Applications 52-139065 and 52-139066), imidazole derivatives, triphenylamine derivatives (Japanese Laid-Open Patent Application 3-285960), benzidine derivatives (Japanese Patent Publication 58-32372), α-phenylstilbene derivatives (Japanese Laid-Open Patent Application 57-73075), hydrazone derivatives (Japanese Laid-Open Patent Applications 55-154955, 55-156954, 55-52063, and 56-81850), triphenylmethane derivatives (Japanese Patent Publication 51-10983), anthracene derivatives (Japanese Laid-Open Patent Application 51-94829), styryl derivatives (Japanese Laid-Open Patent Applications 56-29245 and 58-198043), carbazole derivatives (Japanese Laid-Open Patent Application 58-58552), and pyrene derivatives (Japanese Laid-Open Patent Application 2-94812).

To prepare the photoconductor shown in FIG. 4, a coating liquid for the protective layer 6 is prepared by dissolving the aromatic polycarbonate resin of the present invention, optionally in combination with the binder agent, in a solvent, and the thus obtained coating liquid is coated on the charge transport layer 4 of the photoconductor shown in FIG. 3, and dried.

It is preferable that the thickness of the protective layer 6 be in the range of 0.15 to 10 μm. It is preferable that the amount of aromatic polycarbonate resin of the present invention for use in the protective layer 6 be in the range of 40 to 100 wt. % of the total weight of the protective layer 6.

The electrophotographic photoconductor shown in FIG. 5 can be obtained by the following method:

The aromatic polycarbonate resin of the present invention, optionally in combination with the binder agent, is dissolved in a solvent to prepare a coating liquid for the charge transport layer 4. The thus prepared coating liquid is coated on the electroconductive support 1 and dried, whereby the charge transport layer 4 is provided on the electroconductive support 1. On the thus formed charge transport layer 4, a coating liquid prepared by dispersing the finely-divided particles of the charge generation material 3 in a solvent in which the binder agent may be dissolved when necessary, is coated by spray coating and dried, so that the charge generation layer 5 is provided on the charge transport layer 4. The amount ratios of the components contained in the charge generation layer S and charge transport layer 4 are the same as those previously described in FIG. 3.

When the previously mentioned protective layer 6 is formed on the above prepared charge generation layer 5, the electrophotographic photoconductor shown in FIG. 6 can be fabricated 5.

To obtain any of the aforementioned photoconductors of the present invention, a metallic plate or foil made of aluminum, a plastic film on which a metal such as aluminum is deposited, and a sheet of paper which has been treated so as to be electroconductive can be employed as the electroconductive support 1.

Specific examples of the binder agent used in the preparation of the photoconductor according to the present invention are condensation resins such as polyamide, polyurethane, polyester, epoxy resin, polyketone and polycarbonate; and vinyl polymers such as polyvinylketone, polystyrene, poly-N-vinylcarbazole and polyacrylamide. All the resins having insulating properties and adhesion properties can be employed.

Some plasticizers may be added to the above-mentioned binder agents, when necessary. Examples of the plasticizer for use in the present invention are halogenated paraffin, dimethylnaphthalene and dibutyl phthalate. Further, a variety of additives such as an antioxidant, a light stabilizer, a thermal stabilizer and a lubricant may also be contained in the binder agents when necessary.

Furthermore, in the electrophotographic photoconductor according to the present invention, an intermediate layer such as an adhesive layer or a barrier layer may be interposed between the electroconductive support and the photoconductive layer when necessary.

Examples of the material for use in the intermediate layer are polyamide, nitrocellulose, aluminum oxide and titanium oxide. It is preferable that the thickness of the intermediate layer be 1 μm or less.

When copying is performed by use of the photoconductor according to the present invention, the surface of the photoconductor is uniformly charged to a predetermined polarity in the dark. The uniformly charged photoconductor is exposed to a light image so that a latent electrostatic image is formed on the surface of the photoconductor. The thus formed latent electrostatic image is developed to a visible image by a developer, and the developed image can be transferred to a sheet of paper when necessary.

The photosensitivity and the durability of the electrophotographic photoconductor according to the present invention are remarkably improved.

Other features of this invention will become apparent in the course of the following description of exemplary embodiments, which are given for illustration of the invention and are not intended to be limiting thereof.

EXAMPLE 1-1

Synthesis of Aromatic Polycarbonate Resin No. 1

3.30 parts of a diol with the charge transporting properties, that is, N-{4-[2,2-bis(4-hydroxyphenyl)vinyl] phenyl}-N-(4-methylphenyl)-N-(9,9-dimethyl-2-fluorenyl) amine, represented by the following formula A-1, 2.44 parts of a copolymerizable diol, that is, 2,2-bis(4-hydroxyphenyl) propane, and 0.02 parts of a molecular weight modifier, that is, 4-tert-butyl phenol were placed in a reaction container with stirrer.

(A-1)

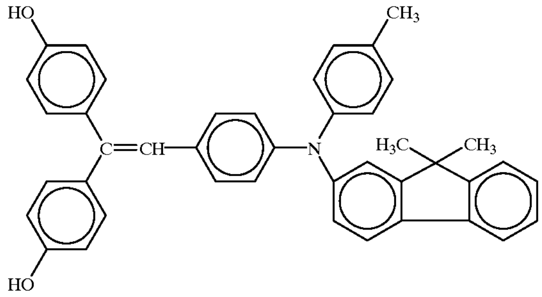

The above prepared reaction mixture was dissolved with stirring in a stream of nitrogen under the application of heat thereto, with an aqueous solution prepared by dissolving 3.35 parts of sodium hydroxide and 0.06 parts of sodium hydrosulfite in 39 parts of water being added to the reaction mixture.

Thereafter, the reaction mixture was cooled to 20° C. and vigorously stirred with the addition thereto of a solution prepared by dissolving 1.93 parts of bis(trichloromethyl) carbonate, that is a trimer of a phosgene, in 33 parts of dichloromethane, thereby forming an emulsion. The polymerization reaction was initiated with the emulsion being formed.

The reaction mixture was then stirred for 15 minutes at room temperature. With the addition of 0.008 parts of triethylamine, the reaction mixture was further stirred for 60 minutes at room temperature. Then, a solution prepared by dissolving 0.127 parts of phenyl chloroformate in 5 parts of dichloromethane was added to the reaction mixture, and the resultant mixture was stirred for 120 minutes at room temperature.

Thereafter, by the addition of 250 parts of dichloromethane to the reaction mixture, an organic layer was separated. The resultant organic layer was successively washed with a 3% aqueous solution of sodium hydroxide, a 2% aqueous solution of hydrochloric acid, and water.

The thus obtained organic layer was added dropwise to large quantities of methanol, whereby a yellow polycarbonate resin was precipitated.

Thus, a polycarbonate resin No. 1 (in the form of a random copolymer) according to the present invention was obtained.

The structural units for use in the polycarbonate resin are shown in Table 1 and the composition ratio of each structural unit is also put beside the structural unit in Table 1, on the supposition that the total number of structural units is 1.

Table 1 also shows the results of the elemental analysis of the obtained polycarbonate resin. The polycarbonate resin was identified as a polycarbonate random copolymer comprising the above-mentioned structural units through the elemental analysis.

The glass transition temperature (Tg) of the above obtained aromatic polycarbonate resin No. 1 was 178.7° C. when measured by use of a differential scanning calorimeter.

The polystyrene-reduced number-average molecular weight (Mn) and weight-average molecular weight (Mw), which were measured by the gel permeation chromatography, were respectively 61,318 and 144,957.

Figure 7:
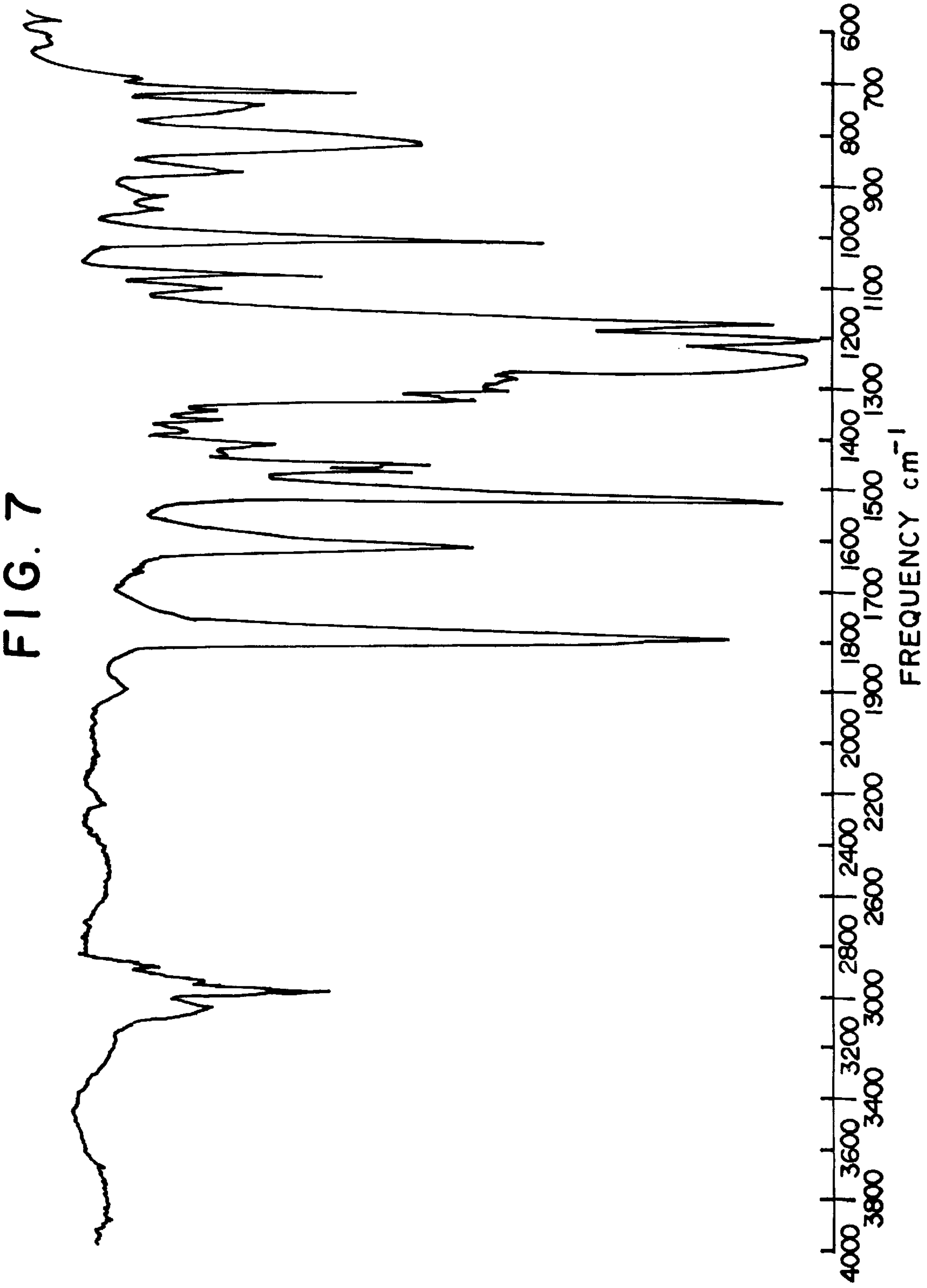
FIGS. 7 to 12 are IR spectra of aromatic polycarbonate resins Nos. 1 to 6 according to the present invention, respectively synthesized in Examples 1-1 to 1-6.
Figure 8:
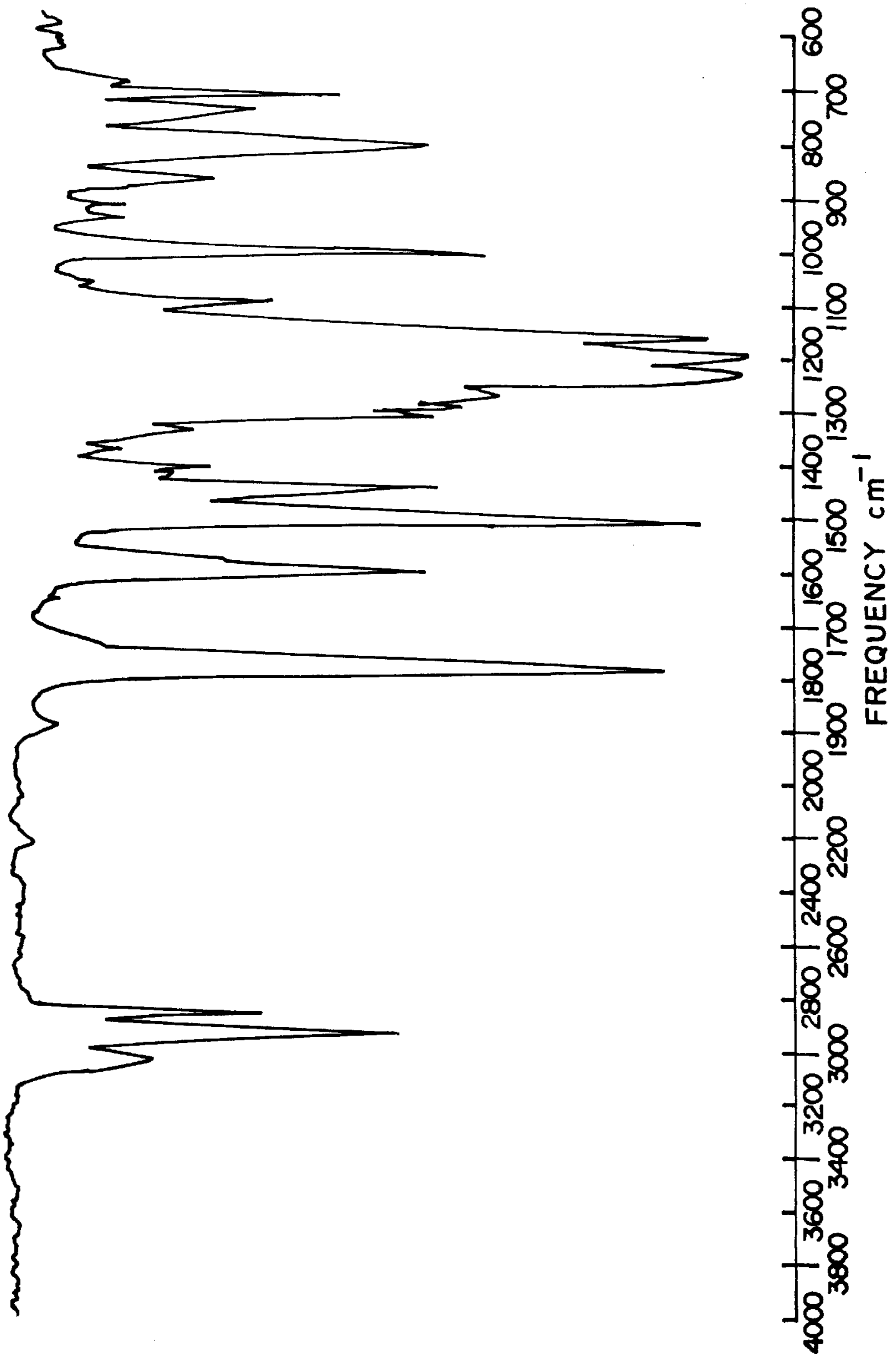
Figure 9:
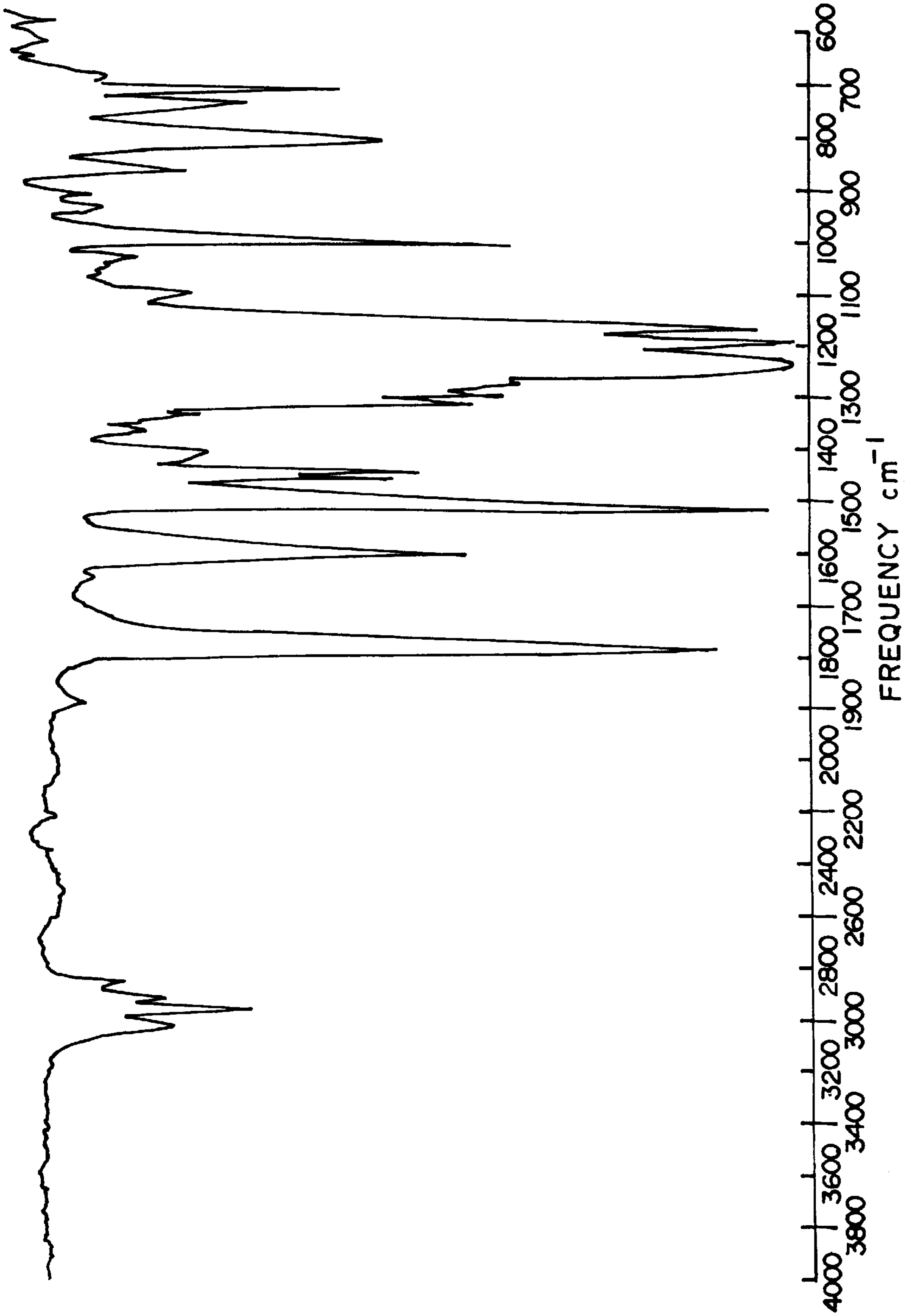
Figure 10:
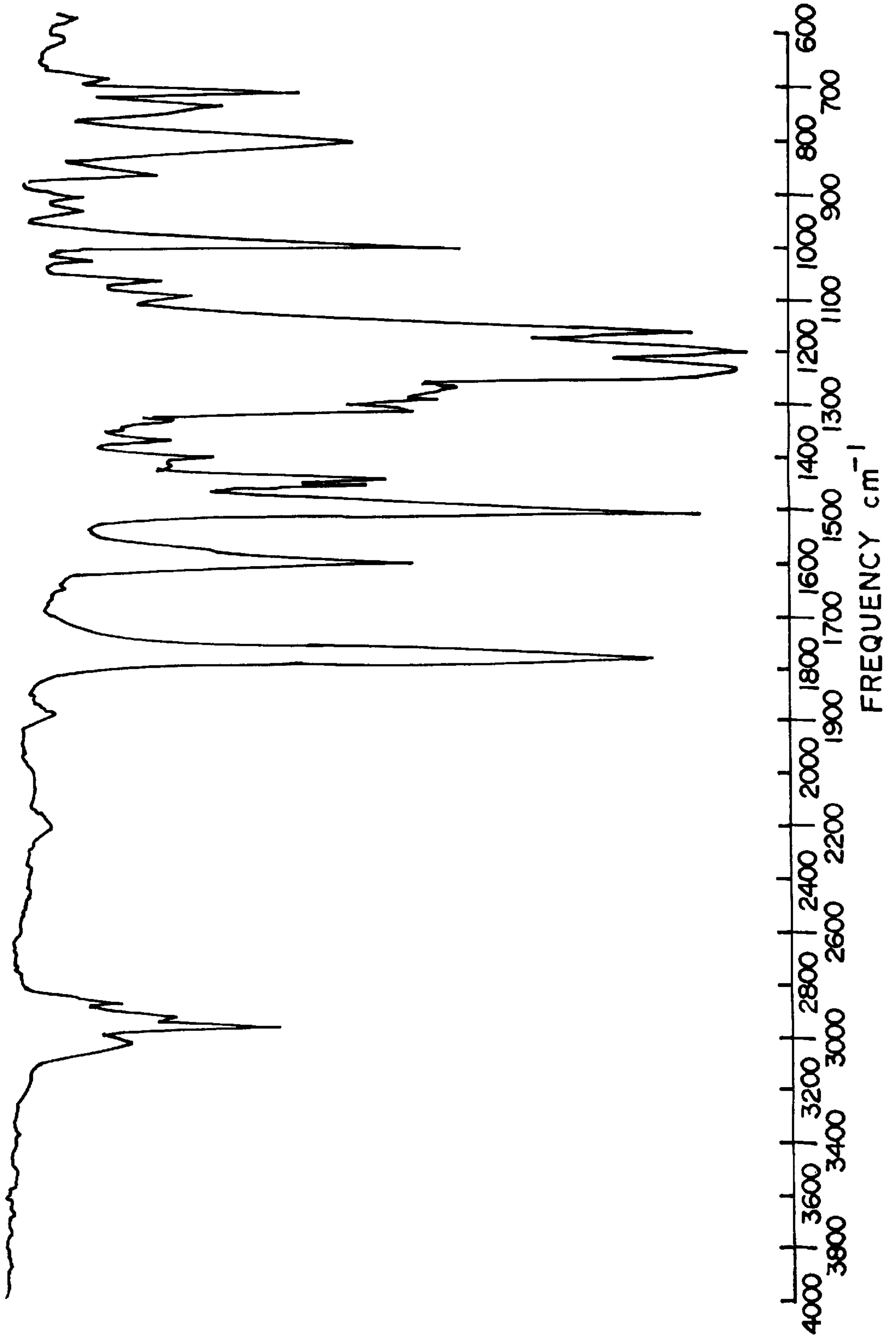
Figure 11:
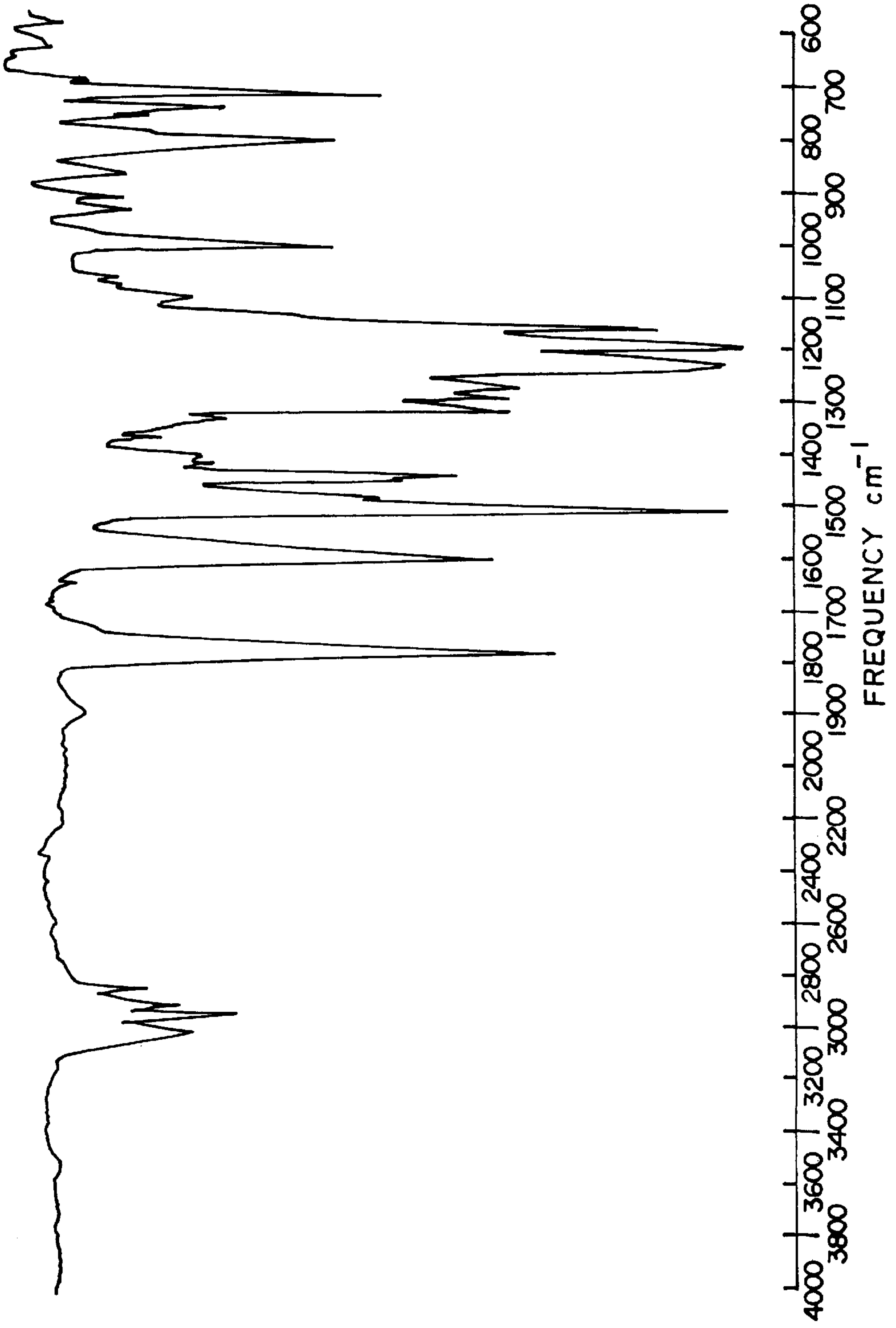
Figure 12:
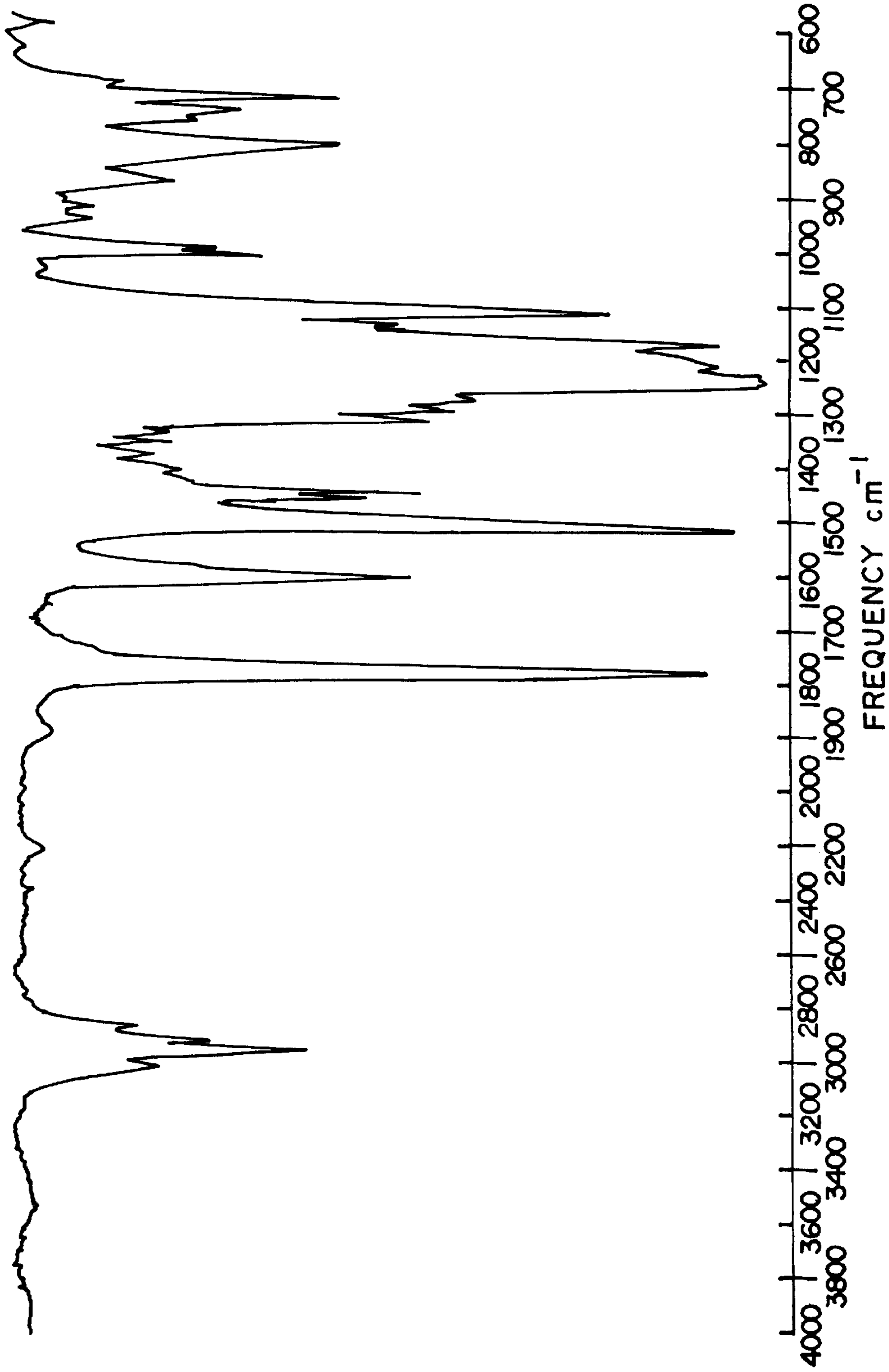

FIG. 7 shows an infrared spectrum of the aromatic polycarbonate resin No. 1, measured by the thin film method.

The IR spectrum indicates the appearance of the characteristic absorption peak due to C═O stretching vibration of carbonate at 1775 $cm^{31\ 1}$.

EXAMPLES 1-2 TO 1-6

Synthesis of Aromatic Polycarbonate Resins No. 2 to No. 6

The procedure for preparation of the aromatic polycarbonate resin No. 1 in Example 1-1 was repeated except that the diol of 2,2-bis(4-hydroxyphenyl)propane employed in Example 1-1 was replaced by the respective diol compounds, and the amount ratios between the two diols were changed.

Thus, aromatic polycarbonate resins No. 2 to No. 6 according to the present invention were obtained, each having structural units as shown in Table 1.

The results of the elemental analysis, the polystyrene-reduced number-average molecular weight (Mn) and weight-average molecular weight (Mw), and the glass transition temperature (Tg) of each polycarbonate resin are shown in Table 1.

Infrared spectra of the aromatic polycarbonate resins No. 2 to No. 6, measured by the thin film method, are respectively shown in FIGS. 8 to 12.

TABLE 1
| Example No. | Resin No. | Structure of Polycarbonate Resin | Molecular Weight (*) Mn | Molecular Weight (*) Mw | Elemental Analysis % C Found (Calcd.) | Elemental Analysis % H Found (Calcd.) | Elemental Analysis % N Found (Calcd.) | Tg (° C.) |
|---|---|---|---|---|---|---|---|---|
| 1-1 | 1 | 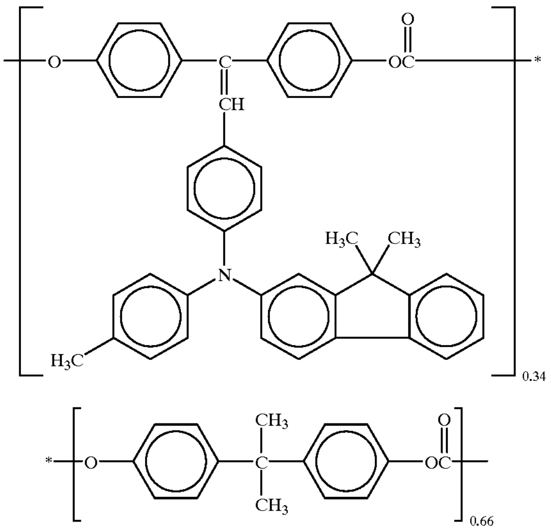 | 61318 | 144957 | 80.93 (80.48) | 5.42 (5.49) | 1.21 (1.27) | 178.7 |
| 1-2 | 2 | 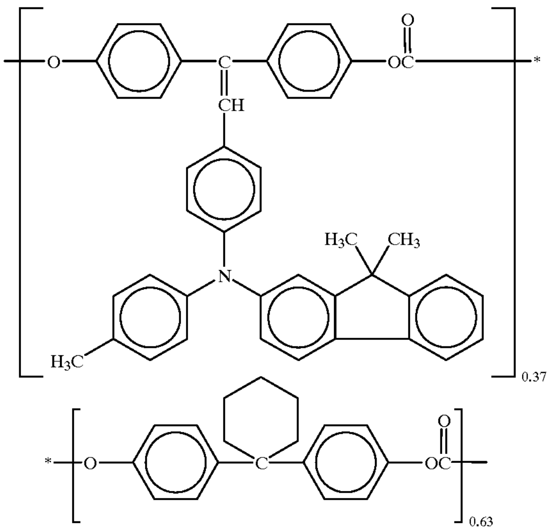 | 43898 | 134403 | 81.69 (81.35) | 5.70 (5.76) | 1.26 (1.27) | 187.3 |

TABLE 1-continued
| Example No. | Resin No. | Structure of Polycarbonate Resin | Molecular Weight (*) Mn | Mw | Elemental Analysis % C Found (Calcd.) | % H Found (Calcd.) | % N Found (Calcd.) | Tg (° C.) |
|---|---|---|---|---|---|---|---|---|
| 1-3 | 3 | 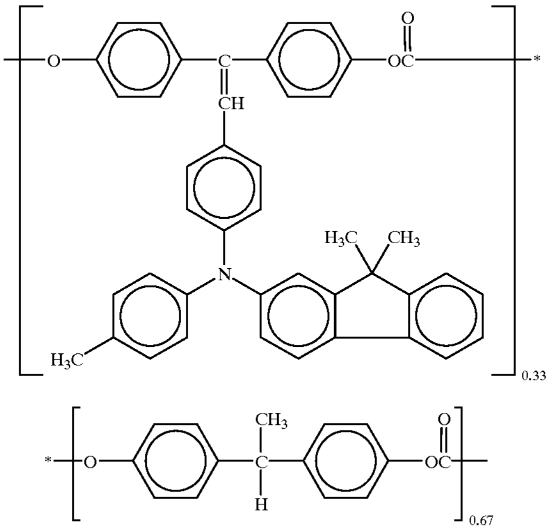 | 55479 | 151592 | 80.70 (80.22) | 5.22 (5.26) | 1.31 (1.27) | 167.2 |
| 1-4 | 4 | 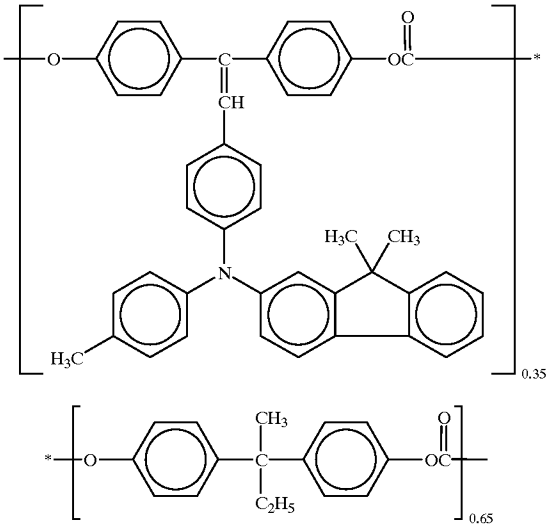 | 58800 | 168654 | 81.37 (80.72) | 5.51 (5.68) | 1.23 (1.27) | 167.2 |
| 1-5 | 5 | 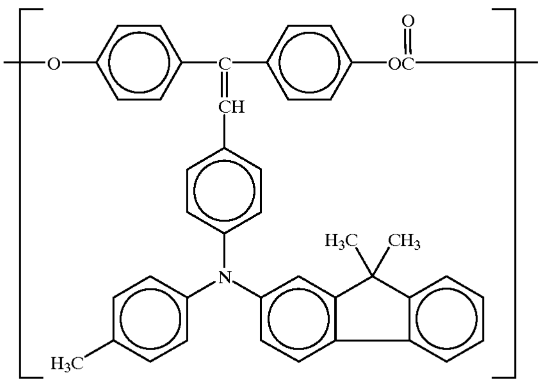 | 20280 | 69038 | 84.63 (84.43) | 5.41 (5.44) | 1.97 (2.29) | 189.4 |

TABLE 1-continued

| Example No. | Resin No. | Structure of Polycarbonate Resin | Molecular Weight (*) Mn | Mw | Elemental Analysis % C Found (Calcd.) | % H Found (Calcd.) | % N Found (Calcd.) | Tg (° C.) |
|---|---|---|---|---|---|---|---|---|
| 1-6 | 6 | 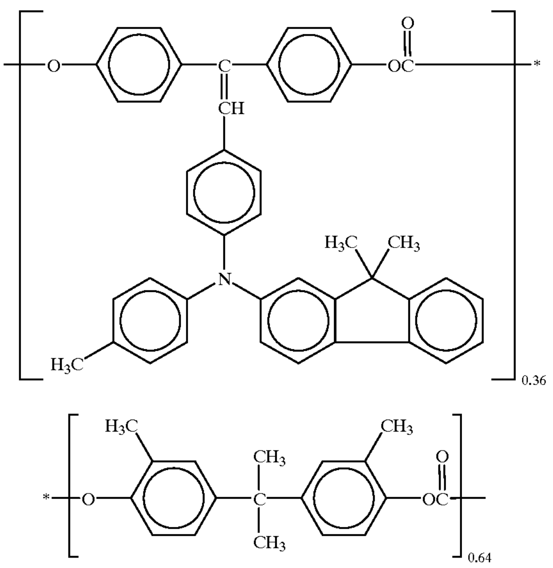 | 62998 | 188579 | 81.41 (80.93) | 5.85 (5.88) | 1.20 (1.27) | 163.2 |

(*) The molecular weight is expressed by a polystyrene-reduced value.

EXAMPLES 1-7 TO 1-16

Synthesis of Aromatic Polycarbonate Resins No. 7 to No. 16

The procedure for preparation of the aromatic polycarbonate resin No. 1 in Example 1-1 was repeated except that the diol of 2,2-bis(4-hydroxyphenyl)propane employed in Example 1-1 was replaced by the respective diol compounds, and the amount ratios between the two diols were changed.

Thus, aromatic polycarbonate resins No. 7 to No. 16 according to the present invention were obtained, each having structural units as shown in Table 2.

The results of the elemental analysis, the polystyrene-reduced number-average molecular weight (Mn) and weight-average molecular weight (Mw), and the glass transition temperature (Tg) of each polycarbonate resin are shown in Table 2.

The absorption peak due to C═O stretching vibration of carbonate in each IR spectrum is also shown in Table 2.

TABLE 2
| Example No. | Resin No. | Structure of Polycarbonate Resin | Molecular Weight (*) Mn | Molecular Weight (*) Mw | Elemental Analysis % C Found (Calcd.) | Elemental Analysis % H Found (Calcd.) | Elemental Analysis % N Found (Calcd.) | Tg (° C.) | Absorption Peak [**] |
|---|---|---|---|---|---|---|---|---|---|
| 1-7 | 7 | 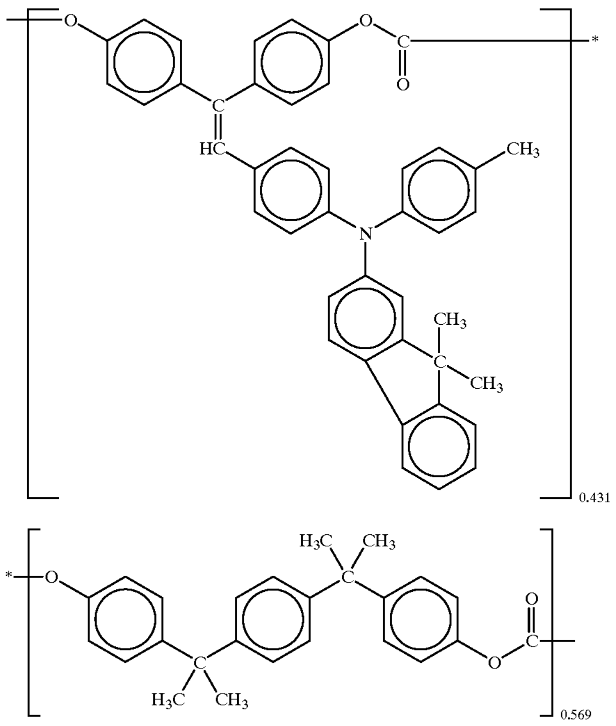 | 58800 | 194400 | 82.82 (82.73) | 5.66 (5.91) | 1.13 (1.27) | 180.0 | 1775 |

TABLE 2-continued
| Example No. | Resin No. | Structure of Polycarbonate Resin | Molecular Weight (*) Mn | Molecular Weight (*) Mw | Elemental Analysis % C Found (Calcd.) | Elemental Analysis % H Found (Calcd.) | Elemental Analysis % N Found (Calcd.) | Tg (° C.) | Absorption Peak [**] |
|---|---|---|---|---|---|---|---|---|---|
| 1-8 | 8 | 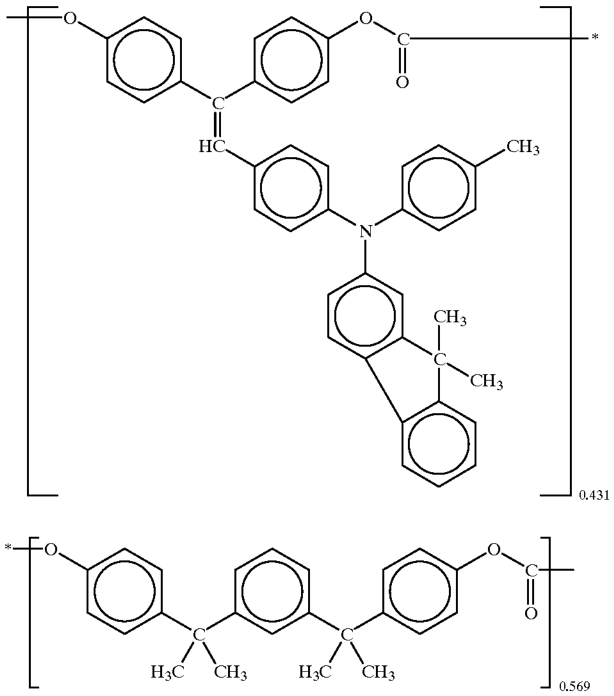 | 40800 | 145300 | 82.59 (82.73) | 5.82 (5.91) | 1.13 (1.27) | 149.1 | 1775 |

TABLE 2-continued
| Example No. | Resin No. | Structure of Polycarbonate Resin | Molecular Weight (*) Mn | Molecular Weight (*) Mw | Elemental Analysis % C Found (Calcd.) | Elemental Analysis % H Found (Calcd.) | Elemental Analysis % N Found (Calcd.) | Tg (° C.) | Absorption Peak [**] |
|---|---|---|---|---|---|---|---|---|---|
| 1-9 | 9 | 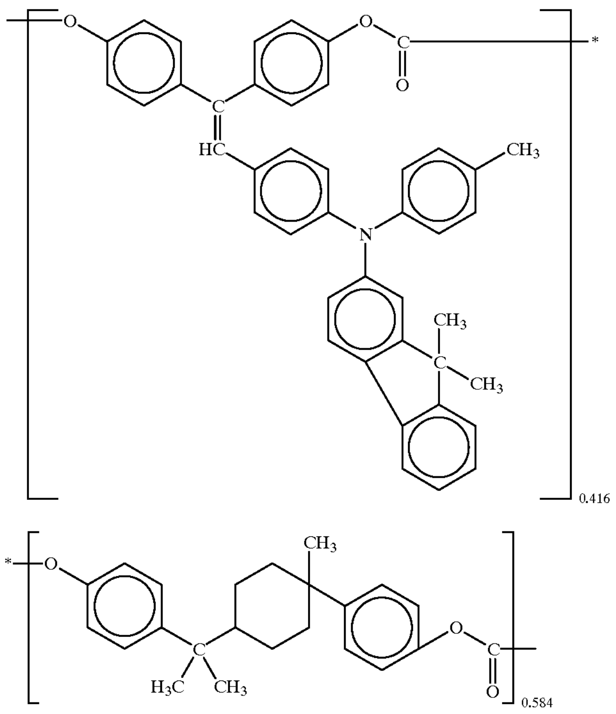 | 45000 | 166200 | 81.95 (81.93) | 6.36 (6.35) | 1.17 (1.27) | 203.5 | 1780 |

TABLE 2-continued
| Example No. | Resin No. | Structure of Polycarbonate Resin | Molecular Weight (*) Mn | Mw | Elemental Analysis % C Found (Calcd.) | % H Found (Calcd.) | % N Found (Calcd.) | Tg (° C.) | Absorption Peak [**] |
|---|---|---|---|---|---|---|---|---|---|
| 1-10 | 10 | 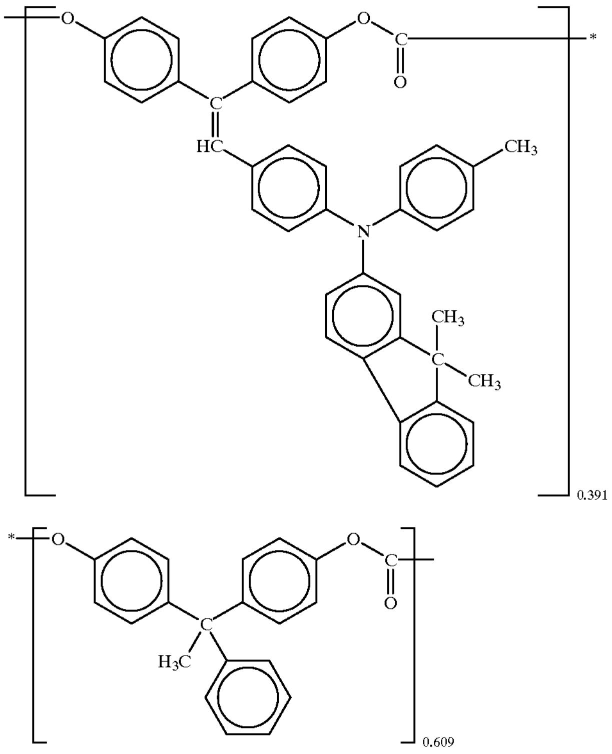 | 51500 | 175600 | 82.18 (82.33) | 5.18 (5.29) | 1.15 (1.27) | 194.0 | 1775 |

TABLE 2-continued
| Example No. | Resin No. | Structure of Polycarbonate Resin | Molecular Weight (*) Mn | Molecular Weight (*) Mw | Elemental Analysis % C Found (Calcd.) | Elemental Analysis % H Found (Calcd.) | Elemental Analysis % N Found (Calcd.) | Tg (° C.) | Absorption Peak [**] |
|---|---|---|---|---|---|---|---|---|---|
| 1-11 | 11 | 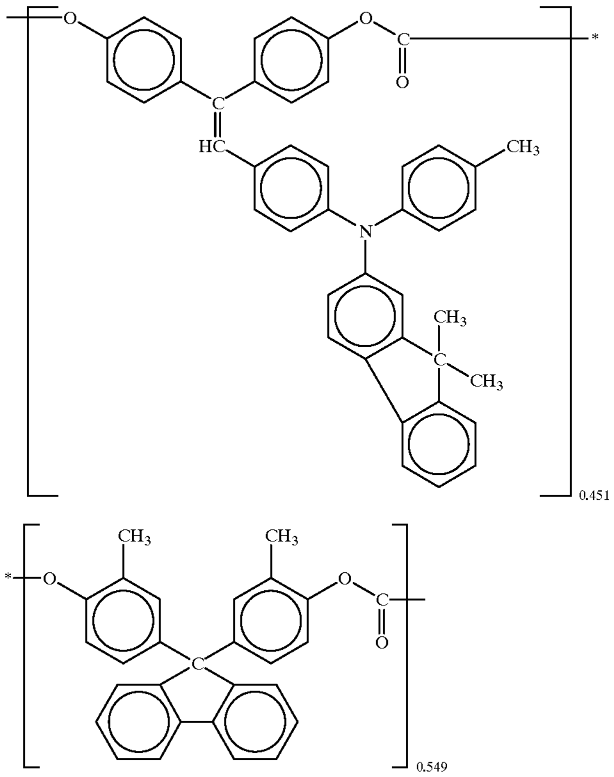 | 43600 | 142600 | 83.79 (83.86) | 5.14 (5.24) | 1.16 (1.27) | 215.5 | 1770 |

TABLE 2-continued
| Example No. | Resin No. | Structure of Polycarbonate Resin | Molecular Weight (*) Mn | Molecular Weight (*) Mw | Elemental Analysis % C Found (Calcd.) | Elemental Analysis % H Found (Calcd.) | Elemental Analysis % N Found (Calcd.) | Tg (° C.) | Absorption Peak [**] |
|---|---|---|---|---|---|---|---|---|---|
| 1-12 | 12 | 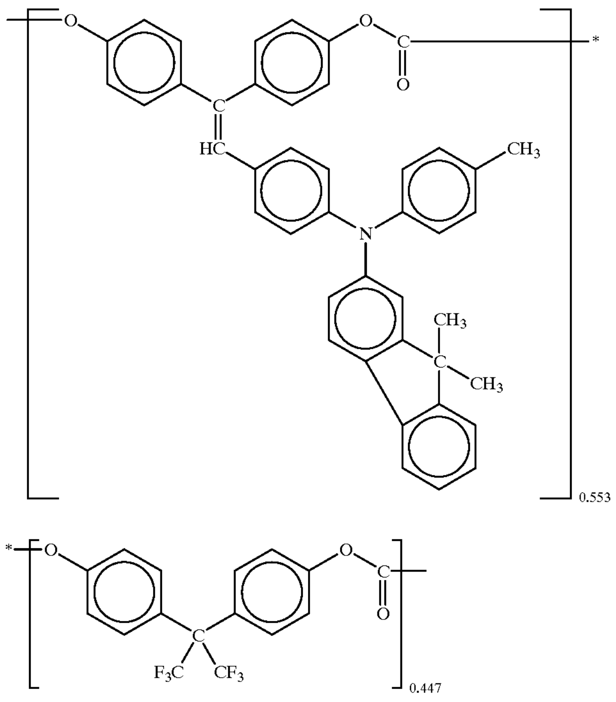 | 78500 | 149800 | 74.03 (74.27) | 4.22 (4.40) | 1.63 (1.55) | 185.0 | 1780 |

TABLE 2-continued
| Example No. | Resin No. | Structure of Polycarbonate Resin | Molecular Weight (*) Mn | Molecular Weight (*) Mw | Elemental Analysis % C Found (Calcd.) | Elemental Analysis % H Found (Calcd.) | Elemental Analysis % N Found (Calcd.) | Tg (° C.) | Absorption Peak [**] |
|---|---|---|---|---|---|---|---|---|---|
| 1-13 | 13 | 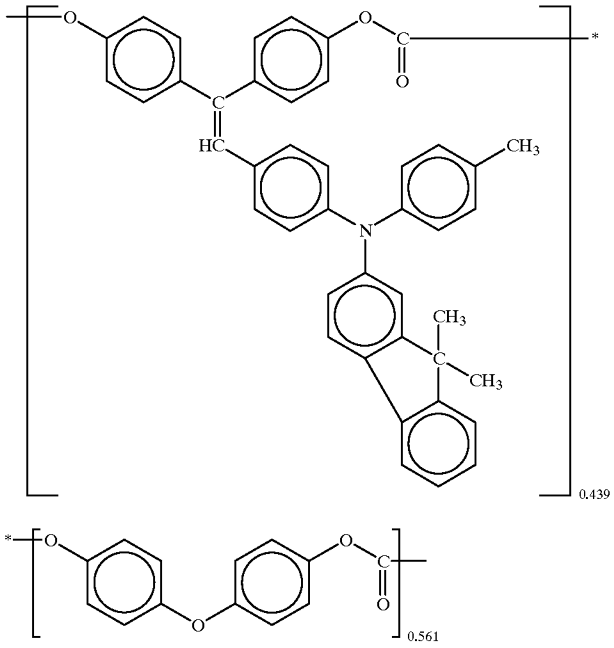 | 61200 | 160000 | 79.01 (79.25) | 4.60 (4.82) | 1.63 (1.55) | 166.6 | 1775 |

TABLE 2-continued
| Example No. | Resin No. | Structure of Polycarbonate Resin | Molecular Weight (*) Mn | Molecular Weight (*) Mw | Elemental Analysis % C Found (Calcd.) | Elemental Analysis % H Found (Calcd.) | Elemental Analysis % N Found (Calcd.) | Tg (° C.) | Absorption Peak [**] |
|---|---|---|---|---|---|---|---|---|---|
| 1-14 | 14 | 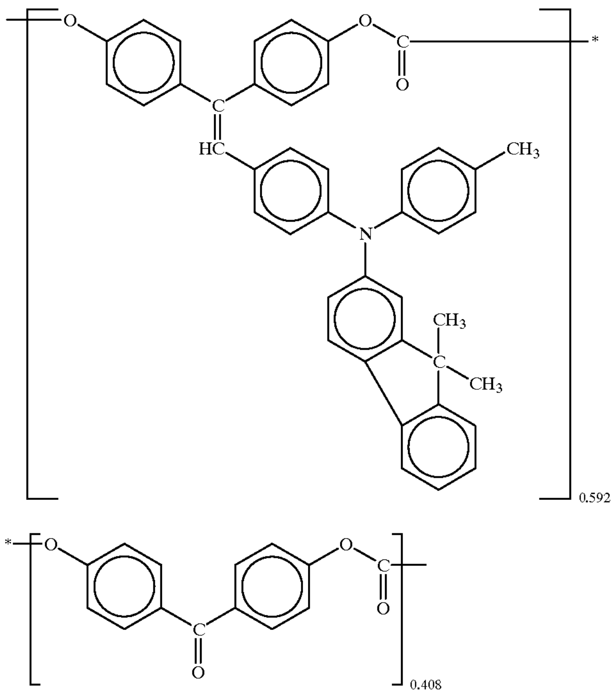 | 18500 | 52200 | 81.52 (81.36) | 4.99 (4.99) | 1.66 (1.80) | 180.5 | 1780 |

TABLE 2-continued
| Example No. | Resin No. | Structure of Polycarbonate Resin | Molecular Weight (*) Mn | Molecular Weight (*) Mw | Elemental Analysis % C Found (Calcd.) | Elemental Analysis % H Found (Calcd.) | Elemental Analysis % N Found (Calcd.) | Tg (° C.) | Absorption Peak [**] |
|---|---|---|---|---|---|---|---|---|---|
| 1-15 | 15 | 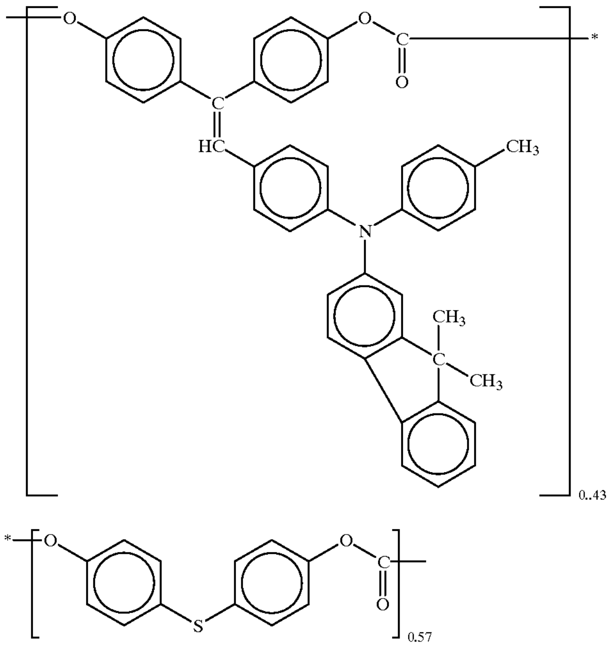 | 42800 | 121300 | 77.46 (77.34) | 4.60 (4.70) | 1.30 (1.50) | 164.5 | 1775 |

TABLE 2-continued

| Example No. | Resin No. | Structure of Polycarbonate Resin | Molecular Weight (*) Mn | Molecular Weight (*) Mw | Elemental Analysis % C Found (Calcd.) | Elemental Analysis % H Found (Calcd.) | Elemental Analysis % N Found (Calcd.) | Tg (° C.) | Absorption Peak [**] |
|---|---|---|---|---|---|---|---|---|---|
| 1-16 | 16 | 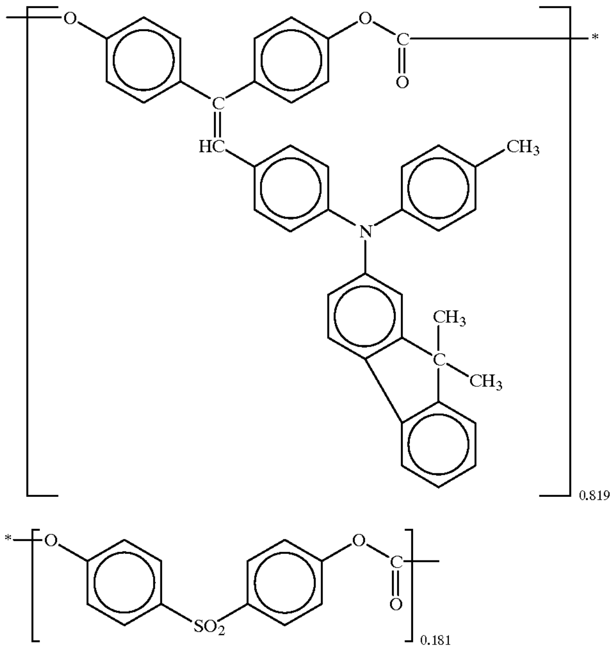 | 6700 | 11600 | 81.71 (81.89) | 5.13 (5.21) | 1.85 (2.08) | 180.0 | 1780 |

(*)The molecular weight is expressed by a polystyrene-reduced value.
(**)Absorption peak due to C═O stretching vibration of carbonate in the IR spectrum.

EXAMPLE 2-1

Fabrication of Photoconductor No. 1

Formation of Intermediate Layer

A commercially available polyamide resin (Trademark "CM-8000", made by Toray Industries, Inc.) was dissolved in a mixed solvent of methanol and butanol, so that a coating liquid for an intermediate layer was prepared.

The thus prepared coating liquid was coated on an aluminum plate by a doctor blade, and dried at room temperature, so that an intermediate layer with a thickness of 0.3 μm was provided on the aluminum plate.

Formation of Charge Generation Layer

A coating liquid for a charge generation layer was prepared by pulverizing and dispersing a bisazo compound of the following formula, serving as a charge generation material, in a mixed solvent of cyclohexanone and 2-butanone using a ball mill. The thus obtained coating liquid was coated on the above prepared intermediate layer by a doctor blade, and dried at room temperature. Thus, a charge generation layer with a thickness of 0.5 μm was formed on the intermediate layer.

Bisazo Compound

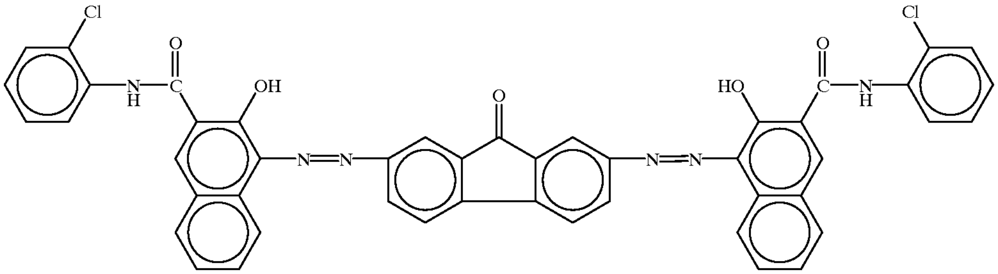

Formation of Charge Transport Layer

The aromatic polycarbonate resin No. 1 of the present invention prepared in Example 1-1, serving as a charge transport material, was dissolved in dichloromethane. The thus obtained coating liquid was coated on the above prepared charge generation layer by a doctor blade, and dried at room temperature and then at 120° C. for 20 minutes, so that a charge transport layer with a thickness of 20 μm was provided on the charge generation layer.

Thus, an electrophotographic photoconductor No. 1 according to the present invention was fabricated.

EXAMPLES 2-2 TO 2-15

The procedure for fabrication of the electrophotographic photoconductor No. 1 in Example 2-1 was repeated except that the aromatic polycarbonate resin No. 1 for use in the charge transport layer coating liquid in Example 2-1 was replaced by each of the aromatic polycarbonate resins as illustrated in Table 3.

Thus, electrophotographic photoconductors No. 2 to No. 15 according to the present invention were fabricated.

COMPARATIVE EXAMPLE 1

The procedure for fabrication of the electrophotographic photoconductor No. 1 in Example 2-1 was repeated except that the aromatic polycarbonate resin No. 1 for use in the charge transport layer coating liquid in Example 2-1 was replaced by a polycarbonate resin (with a weight-average molecular weight of 31,400), comprising the following structural unit of formula (a):

(a)

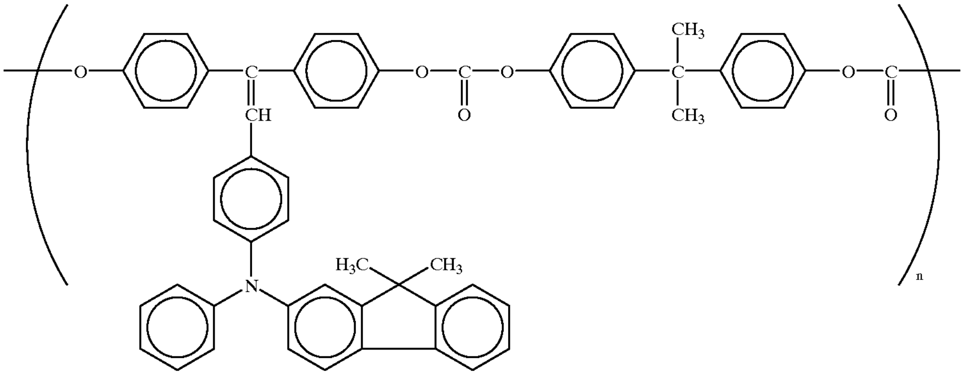

Thus, a comparative electrophotographic photoconductor No. 1 was fabricated.

COMPARATIVE EXAMPLE 2

The procedure for fabrication of the electrophotographic photoconductor No. 1 in Example 2-1 was repeated except that the aromatic polycarbonate resin No. 1 for use in the charge transport layer coating liquid in Example 2-1 was replaced by a polycarbonate resin (with a weight-average molecular weight of 146,000), comprising the following structural units of formula (b):

(b)

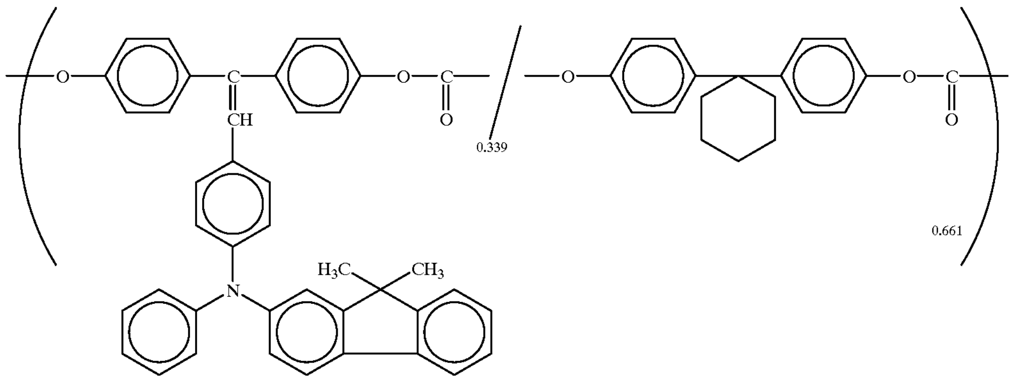

Thus, a comparative electrophotographic photoconductor No. 2 was fabricated.

Each of the electrophotographic photoconductors No. 1 through No. 15 according to the present invention obtained in Examples 2-1 to 2-15, and the comparative electrophotographic photoconductors No. 1 and No. 2 obtained in Comparative Examples 1 and 2 was charged negatively in the dark under application of −6 kV of corona charge for 20 seconds, using a commercially available electrostatic copying sheet testing apparatus ("Paper Analyzer Model SP-428" made by Kawaguchi Electro Works Co., Ltd.). The surface potential (Vm) of each photoconductor was measured.

Then, each electrophotographic photoconductor was allowed to stand in the dark for 20 seconds without applying any charge thereto, and the surface potential (Vo) of the photoconductor was measured.

Each photoconductor was then illuminated by a tungsten lamp in such a manner that the illuminance on the illuminated surface of the photoconductor was 4.5 lux, and the exposure $E_{1/2}$ (lux·sec) required to reduce the initial surface potential Vo (V) to ½ the initial surface potential vo (V) was measured.

Furthermore, the surface potential ($V_{30}$) of the photoconductor was measured after each photoconductor was exposed to tungsten lamp for 30 seconds. The surface potential ($V_{30}$ ) means a residual potential of the photoconductor.

The results are shown in Table 3.

TABLE 3

| Example No. | Polycarbonate Resin No. | −Vm (V) | −Vo (V) | E½ (lux · sec) | $V_{30}$ (V) |
|---|---|---|---|---|---|
| 2-1 | No. 1 | 1482 | 1234 | 1.00 | −3 |
| 2-2 | No. 2 | 1506 | 1276 | 1.04 | −3 |
| 2-3 | No. 3 | 1436 | 1180 | 0.96 | −3 |
| 2-4 | No. 4 | 1518 | 1294 | 0.97 | −3 |

TABLE 3-continued

| Example No. | Polycarbonate Resin No. | −Vm (V) | −Vo (V) | E½ (lux · sec) | $V_{30}$ (V) |
|---|---|---|---|---|---|
| 2-5 | No. 5 | 1483 | 1200 | 0.79 | 0 |
| 2-6 | No. 6 | 1538 | 1340 | 1.04 | −3 |
| 2-7 | No. 7 | 1492 | 1250 | 0.98 | −2 |
| 2-8 | No. 8 | 1502 | 1275 | 0.97 | −2 |
| 2-9 | No. 9 | 1551 | 1354 | 1.27 | −2 |
| 2-10 | No. 10 | 1555 | 1349 | 1.23 | −2 |
| 2-11 | No. 11 | 1539 | 1370 | 1.34 | 1 |
| 2-12 | No. 12 | 1432 | 1194 | 1.11 | −2 |
| 2-13 | No. 13 | 1436 | 1215 | 1.09 | −2 |
| 2-14 | No. 14 | 1142 | 706 | 0.73 | −3 |
| 2-15 | No. 15 | 1350 | 1115 | 0.94 | −3 |
| Comp. Ex. 1 | (a) | 1597 | 1364 | 1.00 | 22 |
| Comp. Ex. 2 | (b) | 1663 | 1442 | 1.19 | 0 |

Furthermore, each of the above obtained electrophotographic photoconductors No. 1 to No. 15 was set in a commercially available electrophotographic copying machine, and the photoconductor was charged and exposed to light images via the original images to form latent electrostatic images thereon. Then, the latent electrostatic images formed on the photoconductor were developed into visible toner images by a dry developer, and the visible toner images were transferred to a sheet of plain paper and fixed thereon. As a result, clear toner images were obtained on the paper. When a wet developer was employed for the image formation, clear images were formed on the paper similarly.

As previously explained, the polycarbonate resin for use in the photoconductive layer of the electrophotographic photoconductor according to the present invention comprises as an effective component at least the structural unit of formula (I) which is provided with the charge transporting properties. Such a polycarbonate resin, for example, a homopolycarbonate resin consisting of the structural unit of formula (I) or a random copolymer polycarbonate resin comprising the structural unit of formula (I) and the previously mentioned structural unit of formula (II) can exhibit excellent charge transporting properties and high mechanical strength. Therefore, the photosensitivity and durability of the photoconductor comprising the above-mentioned polycarbonate resin are sufficiently high.

Japanese Patent Application No. 9-097424 filed Apr. 15, 1997; Japanese Patent Application No. 9-118893 filed Apr. 22, 1997; and Japanese Patent Application No. 10-101223 filed Apr. 13, 1998 are hereby incorporated by reference.

What is claimed is:

1. An aromatic polycarbonate resin comprising a structural unit of formula (I);

(I)

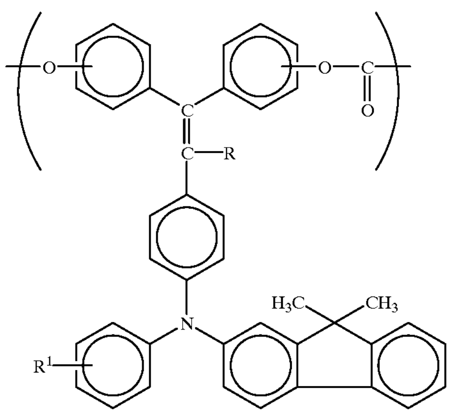

wherein R is a hydrogen atom, an alkyl group which may have a substituent, or an aryl group which may have a substituent; and $R^1$ is an alkyl group which may have a substituent.

2. The polycarbonate resin as claimed in claim 1, wherein said alkyl group represented by R and $R^1$ has 1 to 6 carbon atoms.

3. The polycarbonate resin as claimed in claim 1, wherein said substituent for said alkyl group represented by R and $R^1$ is selected from the group consisting of a fluorine atom, cyano group, and a phenyl group which may have a substituent selected from the group consisting of a halogen atom and a straight-chain, branched and cyclic alkyl group having 1 to 6 carbon atoms.

4. The polycarbonate resin as claimed in claim 2, wherein said alkyl group is selected from the group consisting of methyl group, ethyl group, n-propyl group, i-propyl group, tert-butyl group, sec-butyl group, n-butyl group, i-butyl group, trifluoromethyl group, 2-cyanoethyl group, benzyl group, 4-chlorobenzyl group, 4-methylbenzyl group, cyclopentyl group and cyclohexyl group.

5. The polycarbonate resin as claimed in claim 1, wherein said aryl group represented by R is selected from the group consisting of phenyl group, naphthyl group, biphenylyl group, terphenylyl group, pyrenyl group, fluorenyl group, 9,9-dimethyl-2-fluorenyl group, azulenyl group, anthryl group, triphenylenyl group, chrysenyl group, fluorenylidenephenyl group, 5H-dibenzo[a,d]cycloheptenylidenephenyl group, thionyl group, benzothienyl group, furyl group, benzofuranyl group, carbazolyl group, pyridinyl group, pyrrolidyl group, and oxazolyl group.

6. The polycarbonate resin as claimed in claim 1, wherein said substituent for said aryl group represented by R is selected from the group consisting of a substituted or unsubstituted alkyl group, a substituted or unsubstituted alkoxyl group, a halogen atom, and an amino group represented by the formula of:

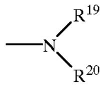

in which $R^{19}$ and $R^{20}$ each is a substituted or unsubstituted alkyl group or a substituted or unsubstituted aryl group.

7. An aromatic polycarbonate resin comprising a structural unit of formula (I) and a structural unit of formula (II), with the relationship between the composition ratios of said structural units being $0<k/(k+j)\leqq 1$ when the composition ratio of said structural unit of formula (I) is k and that of said structural unit of formula (II) is j:

(I)

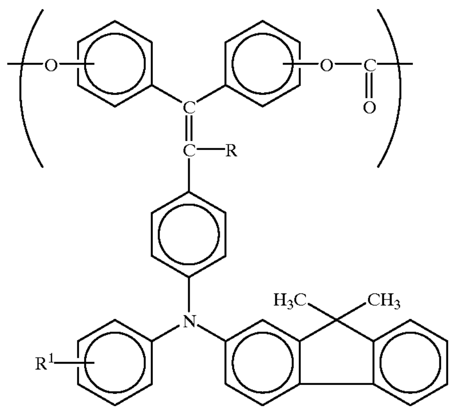

(II)

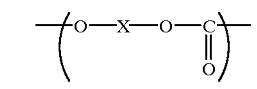

wherein R is a hydrogen atom, an alkyl group which may have a substituent, or an aryl group which may have a substituent; $R^1$ is an alkyl group which may have a substituent; and X is a bivalent aliphatic group, a bivalent cyclic aliphatic group, a bivalent aromatic group, a bivalent group prepared by bonding said bivalent groups,

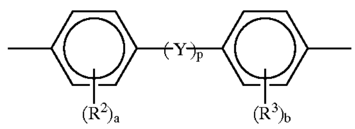

or

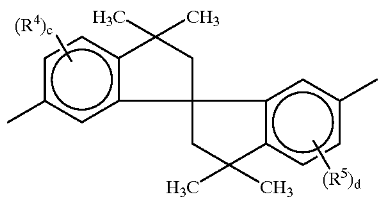

in which $R^2$, $R^3$, $R^4$ and $R^5$ are each independently an alkyl group which may have a substituent, an aryl group which may have a substituent, or a halogen atom;

a and b are each independently an integer of 0 to 4; c and d are each independently an integer of 0 to 3; and p is an integer of 0 or 1, and when p=1, Y is a straight-chain alkylene group having 2 to 12 carbon atoms, —O—, —S—, —SO—, —$SO_2$—, —CO—,

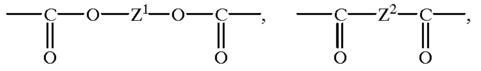

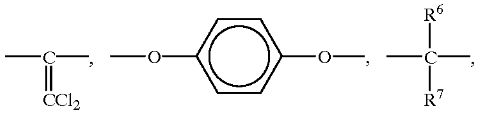

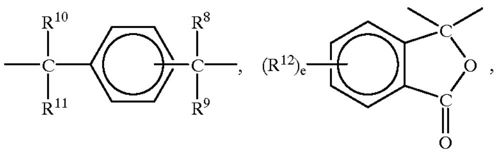

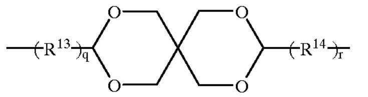

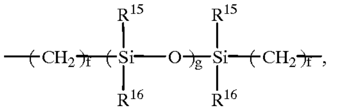

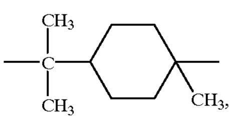

or

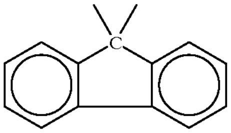

in which $Z^1$ and $Z^2$ are each a substituted or unsubstituted bivalent aliphatic group, or a substituted or unsubstituted arylene group; $R^6$, $R^7$, $R^8$, $R^9$, $R^{10}$, $R^{11}$ and $R^{12}$ are each independently a hydrogen atom, a halogen atom, a substituted or unsubstituted alkyl group having 1 to 5 carbon atoms, a substituted or unsubstituted alkoxyl group having 1 to 5 carbon atoms, or a substituted or unsubstituted aryl group, and $R^6$ and $R^7$ may form together a carbon ring or heterocyclic ring having 5 to 12 carbon atoms or $R^6$ and $R^7$ may form a carbon ring or heterocyclic ring in combination with $R^2$ and $R^3$; q and r are each an integer of 0 or 1, and when q=1 and r=1, $R^{13}$ and $R^{14}$ are each an alkylene group having 1 to 4 carbon atoms; $R^{15}$ and $R^{16}$ are each independently a substituted or unsubstituted alkyl group having 1 to 5 carbon atoms or a substituted or unsubstituted aryl group; e is an integer of 0 to 4; f is an integer of 0 to 20; and g is an integer of 0 to 2000.

8. The polycarbonate resin as claimed in claim 7, wherein said alkyl group represented by R and $R^1$ has 1 to 6 carbon atoms.

9. The polycarbonate resin as claimed in claim 7, wherein said substituent for said alkyl group represented by R and $R^1$ is selected from the group consisting of a fluorine atom, cyano group, and a phenyl group which may have a substituent selected from the group consisting of a halogen atom and a straight-chain, branched and cyclic alkyl group having 1 to 6 carbon atoms.

10. The polycarbonate resin as claimed in claim 8, wherein said alkyl group is selected from the group consisting of methyl group, ethyl group, n-propyl group, i-propyl group, tert-butyl group, sec-butyl group, n-butyl group, i-butyl group, trifluoromethyl group, 2-cyanoethyl group, benzyl group, 4-chlorobenzyl group, 4-methylbenzyl group, cyclopentyl group and cyclohexyl group.

11. The polycarbonate resin as claimed in claim 7, wherein said aryl group represented by R is selected from the group consisting of phenyl group, naphthyl group, biphenylyl group, terphenylyl group, pyrenyl group, fluorenyl group, 9,9-dimethyl-2-fluorenyl group, azulenyl group, anthryl group, triphenylenyl group, chrysenyl group, fluorenylidenephenyl group, 5H-dibenzo[a,d]cycloheptenylidenephenyl group, thienyl group, benzothienyl group, furyl group, benzofuranyl group, carbazolyl group, pyridinyl group, pyrrolidyl group, and oxazolyl group.

12. The polycarbonate resin as claimed in claim 7, wherein said substituent for said aryl group represented by R is selected from the group consisting of a substituted or unsubstituted alkyl group, a substituted or unsubstituted alkoxyl group, a halogen atom, and an amino group represented by the formula of:

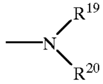

in which $R^{19}$ and $R^{20}$ each is a substituted or unsubstituted alkyl group or a substituted or unsubstituted aryl group.

* * * * *

UNITED STATES PATENT AND TRADEMARK OFFICE

CERTIFICATE OF CORRECTION

PATENT NO. : 6,130,310
DATED : October 10, 2000
INVENTOR(S) : Akira Katayama et al.

It is certified that error appears in the above-identified patent and that said Letters Patent is hereby corrected as shown below:

Column 1,
Line 49, "4,906,444," should read -- 4,806,444, --;
Line 53, "4-19371," should read -- 4-18371, --.

Column 3,
Line 34, "by banding the" should read -- by bonding the --.

Column 9,
Line 23, "dichlorobentene;" should read -- dichlorobenzene; --;
Lines 41-42, "benzyltrimethylammonium" should read -- benzyltriethylammonium --.

Column 11,
Line 33, "dial compound" should read -- diol compound --.

Column 12,
Line 24, "$R^2$ are the same" should read -- $R^1$ are the same --.

Column 13,
Line 68, "the sane substituted" should read -- the same substituted --.

Column 14,
Lines 5-15, "

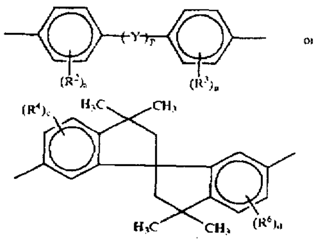

"

should read --

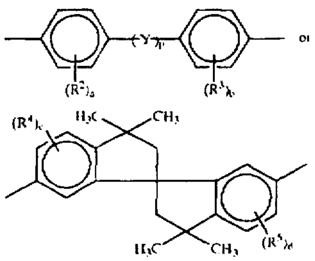

--.

UNITED STATES PATENT AND TRADEMARK OFFICE

CERTIFICATE OF CORRECTION

PATENT NO. : 6,130,310

DATED : October 10, 2000

INVENTOR(S) : Akira Katayama et al.

It is certified that error appears in the above-identified patent and that said Letters Patent is hereby corrected as shown below:

Column 16,
Line 63, "resin)when" should read -- resin) when --.

Column 18,
Line 48, "Eosin S." should read -- Eosin S, --.

Column 20,
Line 42, "a silicon" should read -- a-silicon --.

Column 21,
Line 23, "layer S is" should read -- layer 5 is --.

Column 22,
Line 15, "layer S and" should read -- layer 5 and --.

Column 24,
Line 28, "1775 $cm^{31 1}$" should read -- 1775 $cm^{-1}$ --.

Column 55,
Line 17, "formula (I);" should read -- formula (I): --;
Line 65, "thionyl group," should read -- thienyl group, --.

Signed and Sealed this

Twenty-sixth Day of March, 2002

*Attest:*

JAMES E. ROGAN

*Attesting Officer*

*Director of the United States Patent and Trademark Office*